(12) United States Patent
Geiger

(10) Patent No.: US 10,167,645 B2
(45) Date of Patent: Jan. 1, 2019

(54) BUILDING, IN PARTICULAR A HOSPITAL

(71) Applicant: Gunter Geiger, Monaco (MC)

(72) Inventor: Gunter Geiger, Monaco (MC)

( * ) Notice: Subject to any disclaimer, the term of this patent is extended or adjusted under 35 U.S.C. 154(b) by 0 days.

(21) Appl. No.: 15/106,653

(22) PCT Filed: Dec. 23, 2014

(86) PCT No.: PCT/EP2014/079181
§ 371 (c)(1),
(2) Date: Jun. 20, 2016

(87) PCT Pub. No.: WO2015/097226
PCT Pub. Date: Jul. 2, 2015

(65) Prior Publication Data
US 2016/0348387 A1    Dec. 1, 2016

(30) Foreign Application Priority Data

Dec. 23, 2013    (DE) .................. 10 2013 114 816

(51) Int. Cl.
| | |
|---|---|
| *E04B 1/04* | (2006.01) |
| *E04H 3/08* | (2006.01) |
| *E04B 1/348* | (2006.01) |
| *H02S 20/22* | (2014.01) |
| *H02S 20/30* | (2014.01) |
| *B66B 9/00* | (2006.01) |

(Continued)

(52) U.S. Cl.
CPC .............. *E04H 3/08* (2013.01); *B66B 9/00* (2013.01); *E04B 1/19* (2013.01); *E04B 1/343* (2013.01); *E04B 1/34807* (2013.01); *E04B 1/985* (2013.01); *E04H 9/02* (2013.01); *H02S 20/22* (2014.12); *H02S 20/30* (2014.12); *Y02B 10/10* (2013.01)

(58) Field of Classification Search
CPC .... E04B 1/34807; E04B 1/3404; E04B 1/348; E04H 1/04; E04H 3/08
See application file for complete search history.

(56) References Cited

U.S. PATENT DOCUMENTS 3,623,296 A * 11/1971 Santoro .............. E04B 1/34807
52/79.12
3,733,763 A     5/1973 Drucker
(Continued)

FOREIGN PATENT DOCUMENTS

| CA | 998216 | 10/1976 |
|---|---|---|
| DE | 1958705 | 6/1970 |

(Continued)

OTHER PUBLICATIONS

Examiner: Rolf-Peter Militz, "Office Action" issued in corresponding German Patent Application No. 102013114816.6 with translation, dated Aug. 5, 2014, Published in: DE.

(Continued)

*Primary Examiner* — Brian E Glessner
*Assistant Examiner* — Daniel J Kenny
(74) *Attorney, Agent, or Firm* — Kaplan Breyer Schwarz, LLP

(57) ABSTRACT

A modularly constructed hospital which consists of stackable modules for patients and which is accessed from the outside by means of a service tower without the access paths and the paths for the patients intersecting with each other.

17 Claims, 22 Drawing Sheets

(51) Int. Cl.
*E04B 1/19* (2006.01)
*E04B 1/343* (2006.01)
*E04B 1/98* (2006.01)
*E04H 9/02* (2006.01)

(56) References Cited

U.S. PATENT DOCUMENTS

| | | | | |
|---|---|---|---|---|
| 3,818,654 | A * | 6/1974 | Schramm | E04B 1/3404 52/236.3 |
| 3,872,635 | A * | 3/1975 | Miram | E04B 1/04 52/223.7 |
| 4,612,741 | A * | 9/1986 | Jacobson | E04B 1/3211 52/223.1 |
| 4,752,143 | A * | 6/1988 | Lautenschlager, Jr. | A47B 88/487 312/334.31 |
| 4,766,708 | A | 8/1988 | Sing | |
| 5,265,384 | A | 11/1993 | Menke et al. | |
| 6,360,494 | B1 * | 3/2002 | Emerson | E04H 3/08 52/106 |
| 6,681,531 | B2 * | 1/2004 | McManus | B60P 3/34 296/175 |
| 6,748,704 | B2 * | 6/2004 | Eguchi | E04H 1/005 52/234 |
| 7,127,999 | B2 * | 10/2006 | Roane | B60F 1/04 105/72.2 |
| 7,513,822 | B2 * | 4/2009 | Flitsch | H01L 21/67017 454/187 |
| 9,617,748 | B2 * | 4/2017 | Wilson | E04H 1/005 |
| 2002/0023393 | A1 | 2/2002 | McManus | |
| 2002/0046518 | A1 | 4/2002 | Eguchi et al. | |
| 2006/0143997 | A1 | 7/2006 | Libenson | |
| 2007/0144079 | A1 | 6/2007 | Hourihan | |
| 2014/0318077 | A1 * | 10/2014 | Case | E04B 1/82 52/843 |
| 2016/0090730 | A1 * | 3/2016 | Segall | E04H 1/1205 52/127.7 |

FOREIGN PATENT DOCUMENTS

| | | |
|---|---|---|
| DE | 3036468 | 5/1982 |
| EP | 0118957 A2 | 3/1984 |
| NL | 7404345 | 10/1975 |
| WO | 2006071870 A2 | 7/2006 |
| WO | 2015097226 A2 | 7/2015 |

OTHER PUBLICATIONS

Examiner: Valerie Leroy, "International Search Report and Written Opinion issued" in counterpart International Patent Application No. PCT/EP2014/079181, dated Jul. 27, 2015, Publisher: PCT, Published in: WO.

Authorized Officer: Agnes Wittmann-Regis, "English Translation of the International Preliminary Report On Patentability" issued in counterpart International Patent Application No. PCT/EP2014/079181, dated Jul. 7, 2016, Publisher: PCT.

Examiner: Hongda Li, "Chinese Office Action", Chinese Patent Application No. 201480074694.1, Mar. 16, 2018, 25 pp.

Al Xueming, "Public Building Design", Southeast University Press, Sep. 30, 2009, pp. 281-285.

* cited by examiner

BUILDING, IN PARTICULAR A HOSPITAL

FIELD OF THE INVENTION

The invention relates to a building, in particular configured as a hospital with a plurality of patient rooms. More particularly, the invention relates to a hospital concept for hospitals with more than 100, preferably more than 200 beds and a plurality of treatment stations.

BACKGROUND OF THE INVENTION

The building structure of conventional hospitals differs only slightly from the structure of residential and office buildings.

Rather large hospitals or clinics often consist of a building with a plurality of floors. Usually there are central stairwells and elevator shafts, from which corridors extend leading to the patient rooms and to the treatment stations.

As a consequence of this basic concept, patient care in conventional hospitals is quite costly and time-consuming because the medical staff has to walk long distances to go from one room to another room. In addition to patient care, supply with medicines, food, clean laundry etc. is required. The paths for delivering the articles needed for this supply are intersecting with the paths on which the patients reach a treatment station or go outside. This also causes considerable complexity. Food and laundry is usually transported on carts that are moved by hand, which is tiring and sometimes even dangerous.

Furthermore, a disadvantage of the large overlapping of paths along which supply articles as well as patients are transported is the risk of spreading infectious pathogens and viruses, for instance by having contaminated delivered food or delivered laundry that is transported through the hospital when passing past a sick patient who is transported through the same corridor, for example.

Due to the high complexity and due to cost pressures in the health system, the currently operating hospitals and clinics have to restrict their medical care services more and more, in order to be able to maintain cost-effective operation.

OBJECT OF THE INVENTION

Given this background, the invention is based on the object to provide a building, in particular in the form of a hospital, which has a simplified structure compared to the aforementioned prior art, and in which in particular patient care can be substantially improved.

Patient care and the transfer of patients to the treatment stations should become more efficient and easier, and the risk of spreading pathogens should be reduced by the invention.

SUMMARY OF THE INVENTION

The object of the invention is already achieved by a building and a hospital according to the illustrative embodiment of the present invention.

According to one aspect, the invention relates to a building which is in particular configured as a hospital. However, use of the invention for other types of buildings, in particular hotels, is also conceivable.

According to the invention, the building comprises a skeletal structure with a plurality of floors. The skeletal structure in particular consists of a steel frame made of T or double-T beams which are either welded together or joined by means of screws or rivets.

Preferably, the skeletal structure is constructed of a limited number of prefabricated types of beams. The inventor has in particular found that it is possible to construct even rather large complex building structures with a limited number of different types of beams, in particular with less than 10, preferably less than 7 different types of beams.

Individual modules, each one including one or more rooms, are inserted into the skeletal structure from outside.

Thus, the invention enables to provide standardized prefabricated modules which are delivered in a pre-assembled state, if desired, and which then only have to be inserted into the skeletal structure.

In this way, even large buildings can be build cost-efficiently and very quickly.

In a preferred embodiment of the invention, the skeletal structure has a substantially round cross-sectional shape. In this case, the modules are arranged in a ring around a core area.

It will be understood that within the meaning of the invention a round cross-sectional shape also encompasses an approximation of such a round cross-sectional shape, for example in the form of a polygon with at least four corners.

The individual modules preferably have side walls that do not extend in parallel to each other. That means, such modules are wedge-shaped and may therefore form a ring.

In one embodiment of the invention, the skeletal structure comprises guide rails, onto which the modules that have a complementary groove are inserted.

Such a guide rail provides for easy insertion of the modules in accurately fitting manner.

Preferably, only a single guide rail is disposed approximately centrally below a respective module.

In this manner, the guide rail is particularly easily aligned during erection of the skeletal structure.

The modules for their part preferably have lateral height adjustment elements which in the inserted state are supported on beams of the skeletal structure.

When the module is inserted, the guide rail provides for accurate aligning of the module with respect to the guide rail.

On the lateral sides, a clearance is provided between the skeletal structure and each respective module. Such gaps allow to compensate for tolerances in the shape of the module and/or of the skeletal structure.

Subsequently, the module merely has to be aligned horizontally using the height adjustment elements, which is also made possible due to the lateral gap.

The remaining gap may easily be concealed and sealed by prefabricated covering elements which may in particular constitute part of the later facade.

In its inserted state, the respective module is preferably mounted on vibration dampers.

Such vibration dampers may in particular constitute a component of the height adjustment element.

For example, it is conceivable to provide a height adjustment element with a threaded spindle which is joined to an elastomeric element.

Besides height adjustment, vibration damping will simultaneously be achieved in this way at the support points.

Such vibration damping primarily serves for optimal sound insulation between the individual modules, but moreover increases the seismic safety of the building.

The invention provides for surprisingly good sound insulation even when relatively thin-walled modules are used.

Between the ring of modules and the core area, a corridor is preferably provided.

In this corridor, a walkway or sidewalk or a moving walkway may be provided, for example.

In the embodiment configured as a hospital, treatment rooms are arranged in the core area, as will be described in detail below.

Furthermore, at least one elevator or staircase is located in the core area.

As a result of the configuration with an annular area that includes the individual rooms consisting of modules in conjunction with a central core area, the distances to be walked are substantially shorter in the building concept of the invention than is the case in conventional buildings.

According to one refinement of the invention, at least one fireproof ceiling is provided in the skeletal structure, in particular in case of rather large buildings.

It is in particular contemplated that the skeletal structure that is made of steel includes intermediate ceilings made of concrete between individual floors.

Such concrete ceilings which are only provided every predetermined number of superimposed floors, depending on national fire regulations, prevent the spreading of fire from floor to floor.

Otherwise, concrete ceilings are preferably dispensed with in the skeletal structure, which reduces the construction costs of the building and at the same time makes the structure less susceptible to earthquakes.

The building according to the invention is in particular configured so that especially when used as a hospital, the paths for service, such as the delivery of food and laundry and for garbage collection, are separated from the paths via which patients or guests enter the building. For this purpose, a separate service tower is in particular conceivable, which is arranged outside of the skeletal structure and is connected to the rest of the building through corridors.

The staircases or elevators for guests or patients, in contrast, are preferably located in the core area, i.e. inside the ring of juxtaposed modules.

The invention in particular permits to provide even rather large building complexes that comprise a plurality of buildings according to the invention.

Specifically, a building complex is contemplated which comprises a plurality of buildings according to the invention, that means at least two, preferably at least three buildings which are interconnected by at least one common lower floor.

It is in particular contemplated to provide a lobby or parking garages in this larger lower floor, while the living rooms are distributed over the individual buildings that extend upwards from this lower floor.

The invention furthermore relates to a hospital, which comprises a patients area where patients, visitors and the medical staff of the hospital move, and a service area.

According to the invention, the patients area and the service area are accessible via separate paths and can be entered via separate entrances.

Thus, the delivery of medicines and food and garbage collection takes place over paths that are separated from the paths on which patients and hospital staff move.

In this manner, pathogens from sick patients are prevented from passing over to other items, for example. Furthermore, delivery of the hospital preferably occurs through a disinfecting lock, such as a lock comprising UV lamps. So, the risk that pathogens adhering to delivered items could extensively contaminate the hospital, is largely prevented.

The service area is preferably structurally separated, for example in an adjacent tower.

The entrances to the service area and to the patients area are preferably located on opposite sides of the building.

The invention furthermore relates to a module comprising at least one room, which is adapted to be inserted into a building as described above.

This module preferably has a groove at the bottom thereof for engagement in the rail of the skeletal structure.

According to one refinement of the invention, the module has rounded room corners next to the floor.

Such a configuration facilitates cleaning, in particular when a cleaning robot is employed.

With conventional cleaning robots for wet cleaning of the floor it is usually not possible to clean every corner of the room.

Therefore, rounded corners are preferably provided, into which a brush or a sponge or mop of the robot can reach.

Thus, subsequent manual wiping may be omitted entirely or partly.

The rounded corners may in particular be provided using metal profiles. It is also conceivable that such metal profiles form part of the supporting structure of the respective module.

The metal profiles may in particular serve to connect the bottom of the module with the walls.

In a preferred embodiment of the modules, each module comprises self-contained air conditioning.

It is in particular contemplated that each module has its own fresh air inlet, and moreover it is especially contemplated that the air conditioning system enables the module to be set either to an underpressure or overpressure relative to the environment.

With the self-contained air conditioning, the risk of spreading pathogens from one module to another is reduced.

Provided that the air-conditioning is configured so that an underpressure or overpressure can be generated in a respective module, it is possible to ensure that either no air from the module enters into the building or vice versa, depending on the particular application purpose.

In case the module is used as an isolation station, it can be set under negative pressure thereby largely preventing air and hence pathogens from escaping into the building when a door of the module is opened. In the opposite case, for example for accommodating a patient with an autoimmune disease, which should certainly not come into contact with pathogens, the module is set under excess pressure thereby substantially preventing air from the building, for instance from the corridor of the building, from entering the module when a door is opened.

The module preferably comprises a wet room and a refractory floor.

It is moreover in particular contemplated that each module is provided with connections for water, electricity and wastewater, and that any other technical installation is incorporated in each individual module, so that the latter can be operated independently.

The supply lines necessary for this purpose are preferably running vertically through the building. The connections at the module are preferably accessible through an opening, door, or hatch.

Moreover, the modules may include a sprinkler system.

Preferably, a window is located at a major end face of a wedge-shaped module, and at least one door is located at the minor face thereof.

Doors and technical equipment of the module, such as light switch buttons, toilets, and water flushing are preferably configured so as to be non-touch operable.

In another embodiment, the module comprises an entrance area with an air lock in which the hospital staff may put on protective clothing, for example.

The air lock is pressurized with respect to a living room of the patient.

The invention further relates to a hospital which comprises a plurality of floors with patient rooms arranged on the floors.

The hospital comprises a centrally located core area with at least one treatment station.

The core area may for instance have a modular configuration.

According to a basic concept, treatments are performed in the core area.

Preferably, the different treatment stations of the hospital are distributed over the floors of the core area.

The core area may in particular have a round or polygonal, preferably octagonal cross-sectional shape, so that the patient rooms can be arranged in a ring around the core area.

Furthermore, an annular moving walkway is running around the core area, preferably in a corridor between the core area and the patient rooms.

A moving walkway herein refers to a transport device by means of which patients and/or items can be transported around the core area. This may in particular be an annular conveyor belt around a circular plate, successively arranged articulated links etc. It is also conceivable to configure a polygon from a plurality of straight sections.

Alone because of the concentration of treatment in a centrally located treatment area, distances to be walked are shorter than in conventional hospitals.

Moreover, the moving walkway provides a transport means which considerably facilitates the transport of patients and goods.

A walkway or sidewalk is preferably arranged on at least one side, more preferably on both sides of the moving walkway.

The user can leave the moving walkway by crossing over to the sidewalk. Then, the patient rooms or the core area in which the treatment station is located, can be accessed through doors.

The doors are preferably automatic non-touch opening doors, which also significantly reduces the risk of transmission of pathogens.

It is in particular contemplated to equip patients and hospital staff with a code card or a transponder that comprises a data set which defines when the relevant person has access to which rooms or stations. For example, a patient has access to his or her patient room and has access to the treatment station at a predetermined treatment time. The accessible areas may also be regulated for service staff, doctors and nurses, and that in a way so as to avoid any risk that an unauthorized person enters an area which he or she is not associated with.

Preferably, the hospital itself comprises a main building which has a round or polygonal, in particular a hexagonal cross-sectional shape.

Thus, it is contemplated that the main building comprising a core area in which the treatment stations and preferably also the elevators for the transport of at least the patients are located.

The patient rooms extend in an annular area therearound.

Besides the short distances to walk, this concept additionally offers optimum space utilization.

In one further embodiment of the invention, hatches are provided for supply of the patient rooms, which hatches allow to introduce food and/or medicines and/or clean laundry into the rooms without need to enter. This also facilitates the provision of services.

The invention further relates to a hospital in which the floors are interconnected via elevators.

At least a first elevator is arranged in a core area and/or patients area, and a second elevator is provided in a service area which is located outside of the patients area and is structurally connected to the floors.

It is in particular contemplated that next to the main building a service tower is located which may be of any desired shape, at which goods are delivered and collected.

The inlet and outlet paths to and from this service area do not intersect with the paths via which the patients are guided to the stations.

Furthermore it is possible, as contemplated according to one preferred embodiment of the invention, that each of the paths in the service area is used in only one direction, that means medicines, laundry and other supply goods for the hospital are brought into the hospital via the service tower in one direction, and are preferably transported out of the hospital via a different path that is structurally separated by walls.

For the transport of food, laundry and medicines, in particular automated vehicles are provided which drive into the core area via predefined routes in the service area, so that the goods can be removed there and can be brought to the patients over very short distances.

The invention further relates to a hospital in which the patient rooms have a modular configuration.

Hence, patient modules are provided comprising at least one bed and sanitary installations. Furthermore, a core area with a treatment station is provided, around which the modules are arranged.

The modules may have a substantially similar and standardized configuration. It is also conceivable that the core area with the treatment stations is built with a modular configuration.

Modular configuration means that the patient modules are easily integrated and removed. These modules are preferably stackable around the core area.

Preferably, the patient modules include central connections for electricity, hot water, and/or wastewater.

Thus, the standardized modules can be easily erected and connected. Moreover, only short cable lengths are required.

It is in particular conceivable to provide central ducts in a service shaft in the core area, to which the stacked modules can be connected.

In this way, a prefabricated hospital can be build within a short time period.

According to a further embodiment of the invention, the main building comprises a solar module which is rotatable about the round or polygonal section of the building.

This solar module may be aligned to the sun position and can partly ensure power supply of the hospital.

Additionally, in case of strong sunlight the solar module at the same time serves to shade the concerned patient rooms.

Thus, the essential features of the invention can be summarized as follows:

The building has a modular configuration and the patient rooms extend around an inner core area. With the functional inner core area in which in particular technical equipment for the treatment of patients etc. is located, improved functionality is offered both in technical and economic terms.

A rotating moving walkway in a corridor adjacent to the core area with sidewalks alongside ensures that doctors, nurses, and other staff will reach every patient room quickly. Walking over the anyway short distances is largely avoided.

Delivery and collection services (especially for medicines, food, beverages, room service, garbage collection) are concentrated outside the core area. Because of the new building concept, the area in which maintenance and repair takes place is much smaller, whereby a cost reduction of 40% can be achieved. The supply and disposal services are mainly accomplished on paths that are separated from patients and doctors areas. Overlapping preferably solely occurs in the corridor that extends around the core area.

With this separation, the risk of spreading pathogens is reduced. Furthermore, the switch buttons in the hospital, in particular for doors, elevators, bathroom installations, and call buttons for services are preferably designed so as to be non-touch operable. This particularly applies to switch buttons for tap water, toilets, lighting, doors etc.

A preferably rotating solar wing is directly connected to the building and turns itself towards the sun in order to achieve maximum energy yield.

The patient rooms have a modular configuration and may for instance be provided in versions with 5 beds and, with appropriate subdivision, with 2 beds or 1 bed. The basic module consists of a bottom and walls and has consistent dimensions so that modules can be combined in any desired way.

Furthermore, the modules are equipped with plug-in connections for power supply, water, and ventilation already in the delivery state. During erection of the hospital, these connections only have to be plugged.

Additionally, a plug-in connection for wastewater is provided. In particular waterless toilets and urinals are provided which are emptied via a vacuum line.

The water from showers and sinks can be recycled, for example to be used for toilet flushing or for pre-washing dishes and textiles.

The modules have connections and are completely pre-fabricated, so that no further work is required besides the connection by means of plug-in connections.

In order to obtain a desired capacity of in particular up to 1,000 beds, a plurality of main buildings of identical configuration may be built next to each other, whereby construction costs can be reduced by 40%. Each floor is stackable. The main building in particular has a circular, hexagonal, or oval shape.

With the same system and the same components it is possible to construct hospitals with a number of beds from 100 to 1,000 beds.

A central service area for maintenance, garbage collection, and services is provided, which also reduces the risk of spreading pathogens.

The patient stations can be directly reached and accessed via the moving walkway. Due to the reduced distances, effectiveness of the staff can be improved by 30%.

Elevator shafts with power generators provide for additional energy yield. The elevators are preferably driven by linear motors and do not have cable.

Each floor is preferably designed with a different functionality, in particular reception, arrival and departure, library, meeting rooms, a cafeteria for patients and visitors, rest rooms, and patient rooms.

The floors can be stacked according to the desired functionality and desired medical service, including different software and hardware for each floor.

The connections for all types of service are arranged in the core area.

Furthermore, the hospital preferably has automatic delivery and garbage collection devices, in particular automatically moving vehicles for supply of medicines, food, beverages, and for collecting waste.

The supply containers may moreover be automatically washed and cleaned, including exposure to UV radiation to kill pathogens, for example.

The building furthermore allows for cleaning by robots, which also increases efficiency.

The hardware for technical equipment is preferably also provided with non-touch switch buttons. Replaceable washable masks are conceivable. The individual floors may be equipped with wireless data connections. RFID chips may be used for monitoring inventory and for assigning access authorizations.

The invention further relates to the use of automatically moving vehicles in a building. Accordingly, an automatically moving vehicle is contemplated, that is a vehicle which comprises sensors by means of which it moves through the building autonomously. It will be understood that it is also conceivable that the vehicle is displaced manually, at least partially.

The vehicle comprises at least one chamber which is closed by a slide-up roller shutter and which has inserts, preferably for food.

Such vehicles are especially intended for distributing food in a hospital.

In this case, the food to be distributed may be accommodated in the inserts, and the roller shutters are opened gradually during the distribution of the food. This ensures that at each moment the shutter is opened only to the extent to which the food has already been distributed.

In this manner, unintended heating or cooling of the food is avoided. Moreover, hygiene is improved in this way.

The vehicle preferably comprises at least two adjacent chambers which are thermally insulated.

It is moreover in particular contemplated to provide the vehicle with chambers that can be cooled or heated.

In an advantageous embodiment, the vehicle comprises an air conditioning device. In this case, the heat exchanger of a cold side of the air conditioning device may in particular be connected with a cooling chamber, and the heat exchanger of a hot side of the air conditioning device may be connected to a heating chamber. In this way, a vehicle which has both a cooling chamber, for example for storing cold beverages and fruit, and a heating chamber, for example for distributing hot meals, can be provided in a particularly energy-efficient manner.

BRIEF DESCRIPTION OF THE DRAWINGS

The invention will now be described in more detail by way of schematically illustrated exemplary embodiments and with reference to the drawings of FIG. 1 through FIG. 22.

DETAILED DESCRIPTION

Figure 1:
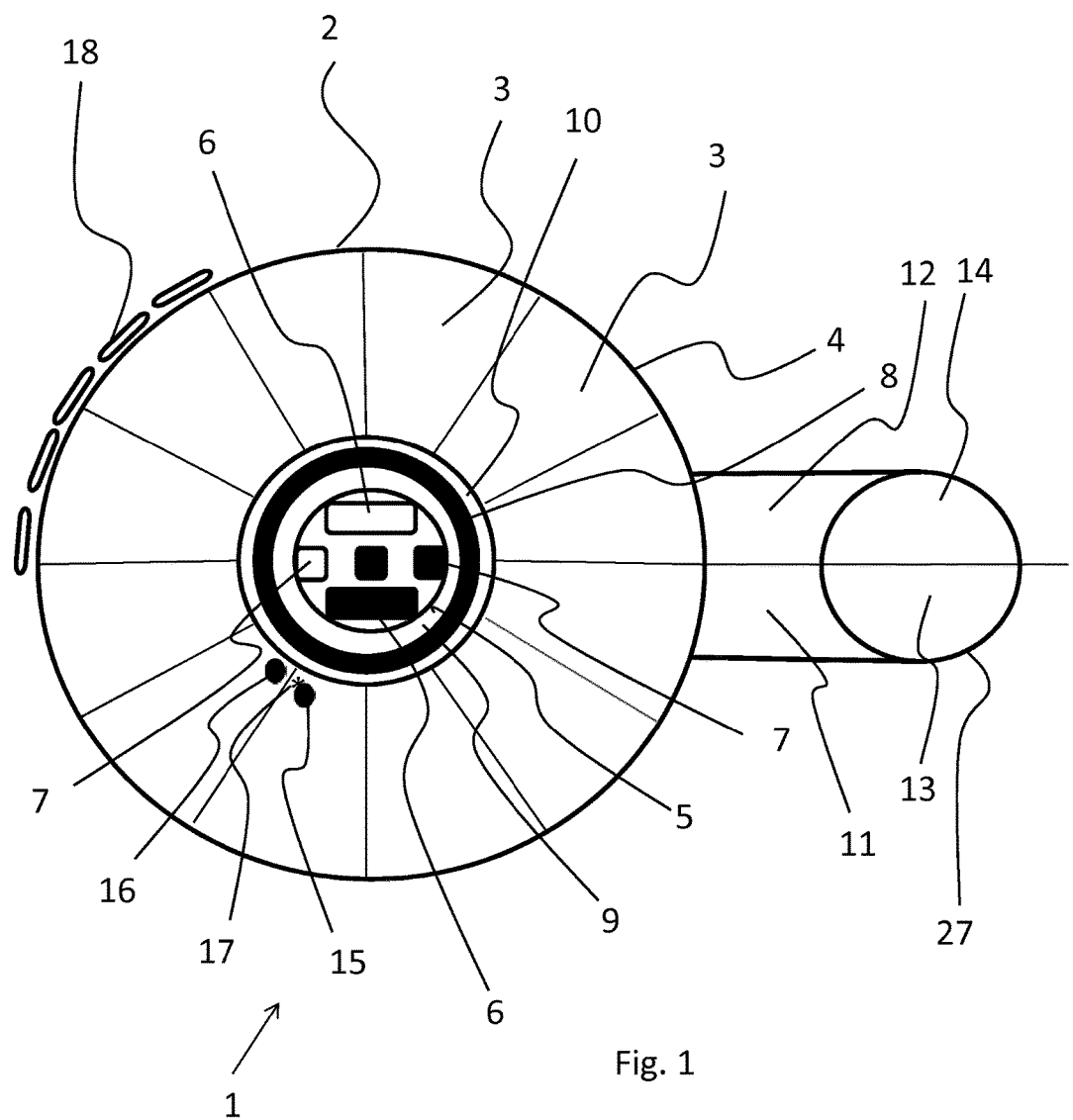
FIG. 1 shows a first exemplary embodiment of a hospital in a cross-sectional view along a horizontal plane.

FIG. 1 shows a first exemplary embodiment of a hospital 1 in a cross-sectional view along a horizontal plane.

Hospital 1 comprises a circular main building 2.

In main building 2, patient rooms 3 are arranged around a central circular core area 5.

Patient rooms 3 are preferably configured as self-supporting prefabricated modules. Each patient room 3 has one or more patient beds (not shown) arranged therein.

It will be clear that patient rooms 3 are not rectangular in this exemplary embodiment but rather are widening towards the outer wall of main building 2. The core area 5 may also be a prefabricated module.

In core area 5, treatment stations 7 are located, which in conventional manner comprise rooms or at least partitions inside of which there are treatment areas where doctors treat or examine the patients.

Furthermore, elevators 6 are provided in core area 5, through which the patients or staff can pass to other stations of the main building 2.

A corridor with an annular moving walkway 8 extends around core area 5. Via the moving walkway 8, the individual patient rooms 3 are reached quickly and through short distances.

Adjacent to moving walkway 8, a respective walkway or sidewalk 9, 10 extends on both sides thereof.

In order to enter a patient room 3, for example, the particular person may pass over to sidewalk 10 and may then enter the patient room 3 through the door (not shown).

It goes without saying that the individual patient rooms 3 may likewise furthermore contain partitions to divide them into a plurality of individual rooms.

Patient rooms 3 preferably have opposite bathrooms 15, 16 which can be connected to an intermediate service shaft 17.

The wall 4 of main building 2 preferably consists of the sections of the individual modular patient rooms 3.

The main building 2 is equipped with a rotatable solar module 18 which has its axis of rotation mounted in the core area 5.

Adjacent to main building 2, a multi-floor service tower 27 is located.

Service tower 27 includes elevators 13, 14.

Through elevators 13, 14, the individual floors of hospital 1 are supplied with medicines and other articles.

The corridor extending from service tower 27 is preferably divided into two areas 11, 12. For example, articles are transported away via corridor 11 and are brought in via corridor 12.

As a result of this concept, the areas in which patients are transported within the core area 5 do not overlap or intersect with the paths in the service area.

Figure 2:
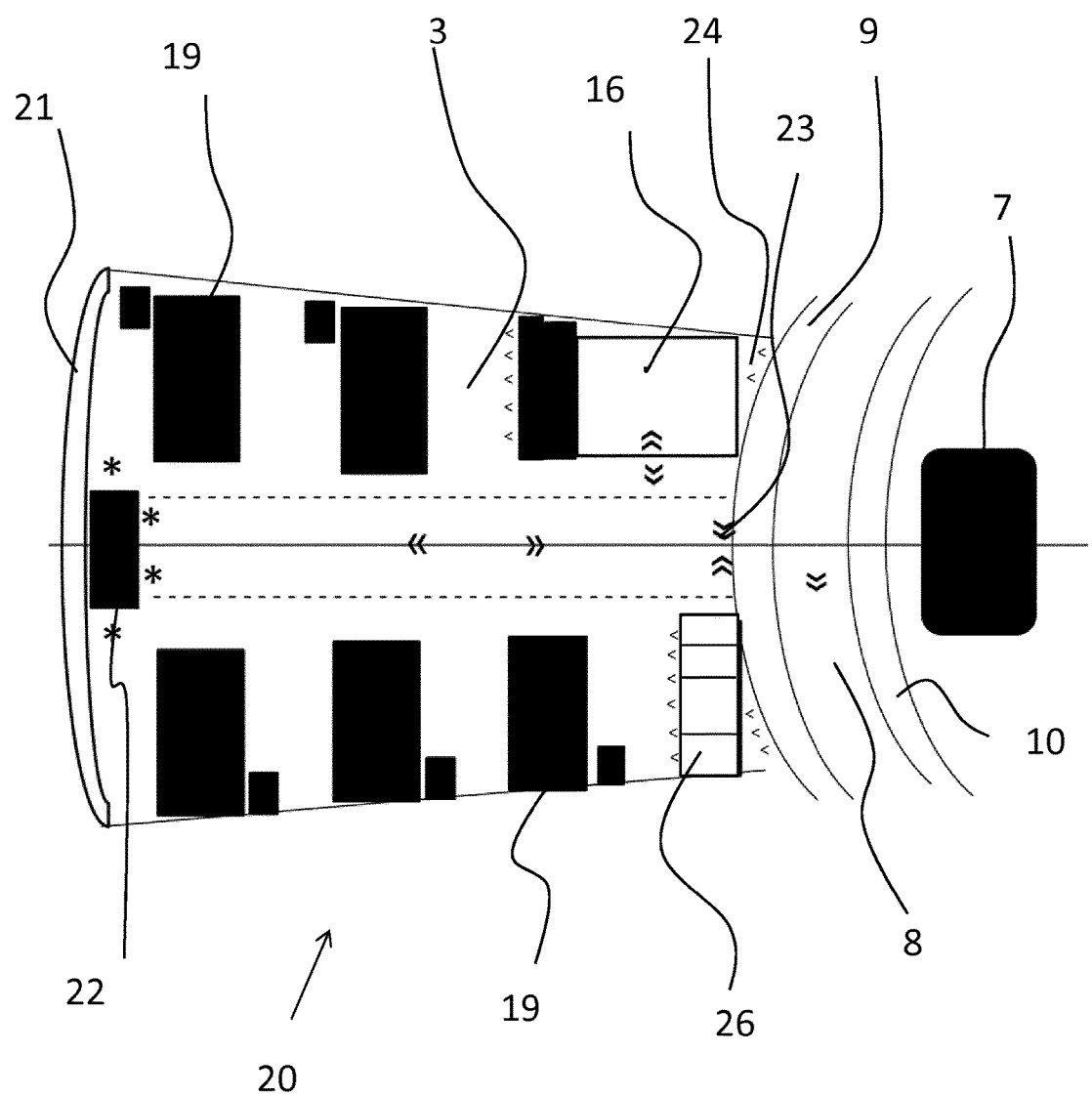
FIG. 2 shows a detailed view of a single patient module which forms a patient room.

FIG. 2 shows a detailed view of a single patient module 20 which forms a patient room 3.

Module 20 is configured so that it can be stacked with other substantially identically configured modules and can be assembled into an annular section of the building.

Module 20 has a window 21 in the outer wall thereof.

In this exemplary embodiment, a plurality of beds 19 are arranged in the module 20.

Furthermore, module 20 has a bathroom 16, which is supplied with water and power via central connections (not shown).

Module 20 can be entered through a non-touch automatically opening door 23.

Non-touch opening door 23 opens to a corridor in which the moving walkway 8 is arranged.

Now, when a patient is brought from patient room 3 to the core area, he or she can reach the moving walkway 8 via sidewalk 9 and can then enter the core area via sidewalk 10 through a further non-touch automatically opening door (not shown) to reach treatment station 7.

Furthermore, patient module 20 includes a hatch 24 adjacent to a bathroom, through which for example towels may be introduced from the corridor into the bathroom 16.

Another hatch 26 is provided for food and medicines.

Due to the hatches, medicines and food can be introduced into the patient room 3 without need to enter.

Figure 3:
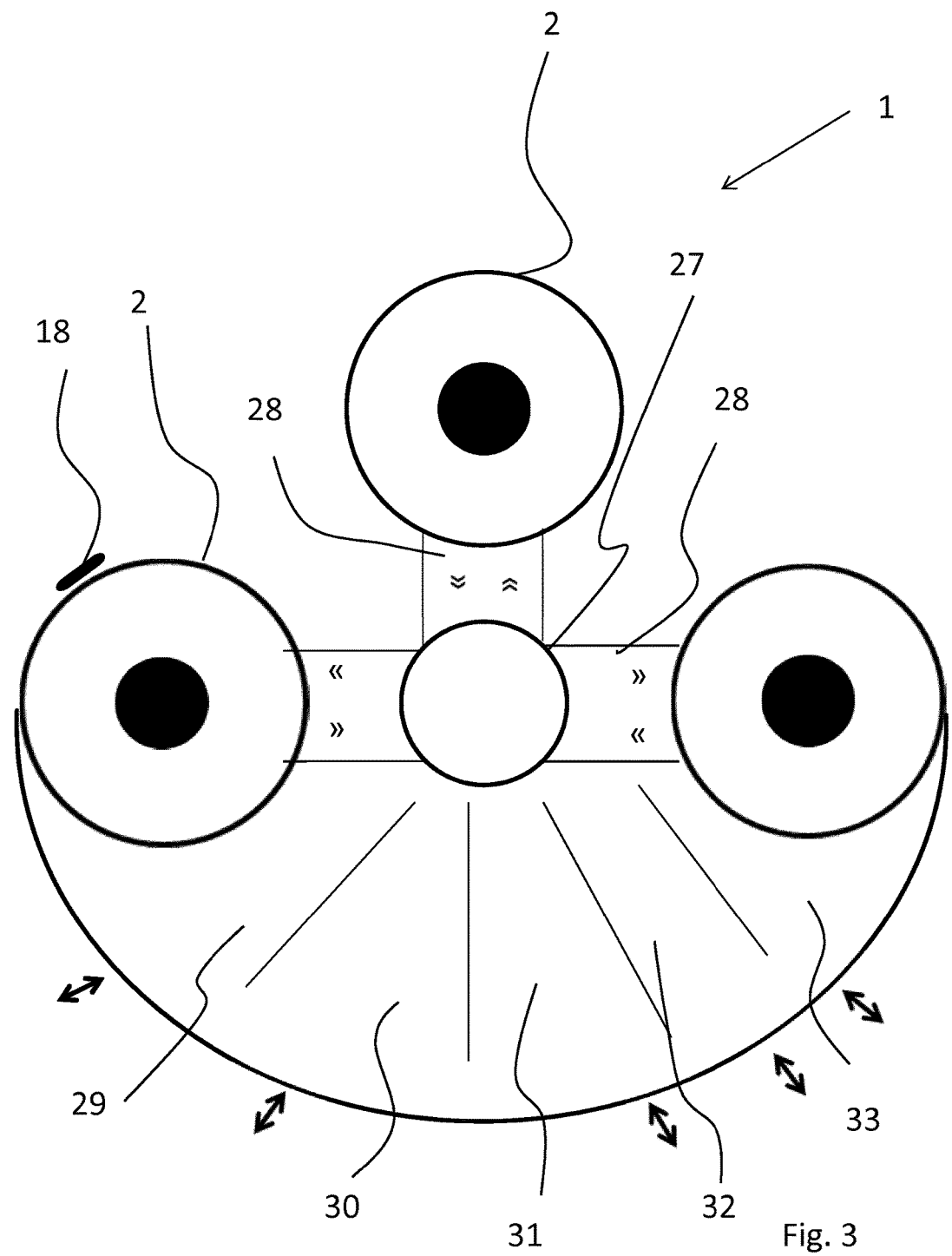
FIG. 3 shows a hospital with a total of more than 500 beds.

FIG. 3 shows a hospital 1 with a total of more than 500 beds.

Hospital 1 comprises a plurality of main buildings 2, in the present embodiment three, which correspond to that of FIG. 1 and may in particular include a rotatable solar module 18.

The individual main buildings 2 are connected with a service tower 27 via corridors 28.

The service tower 27 also essentially corresponds to the exemplary embodiment shown in FIG. 1, but in the present exemplary embodiment the service tower is intended for simultaneously supplying three main buildings.

On the side of the hospital, at which there is no main building, access roads are provided for supplying the hospital.

There is a delivery area for medical products 29, a delivery area for food 30, a delivery area for laundry 31, a delivery area for building maintenance 32, and a garbage collection area 33.

In this way, delivery to the service tower 27 is managed efficiently.

The service side is completely decoupled from the patient side, which furthermore reduces the risk of transmission of pathogens.

In service tower 27 and in corridors 28, the directions on which the goods are moved are separated from each other.

It is in particular contemplated that via the service tower which includes elevators, and via the corridors, automated vehicles (not shown) deliver medicines and other articles to the individual main buildings.

Figure 4:
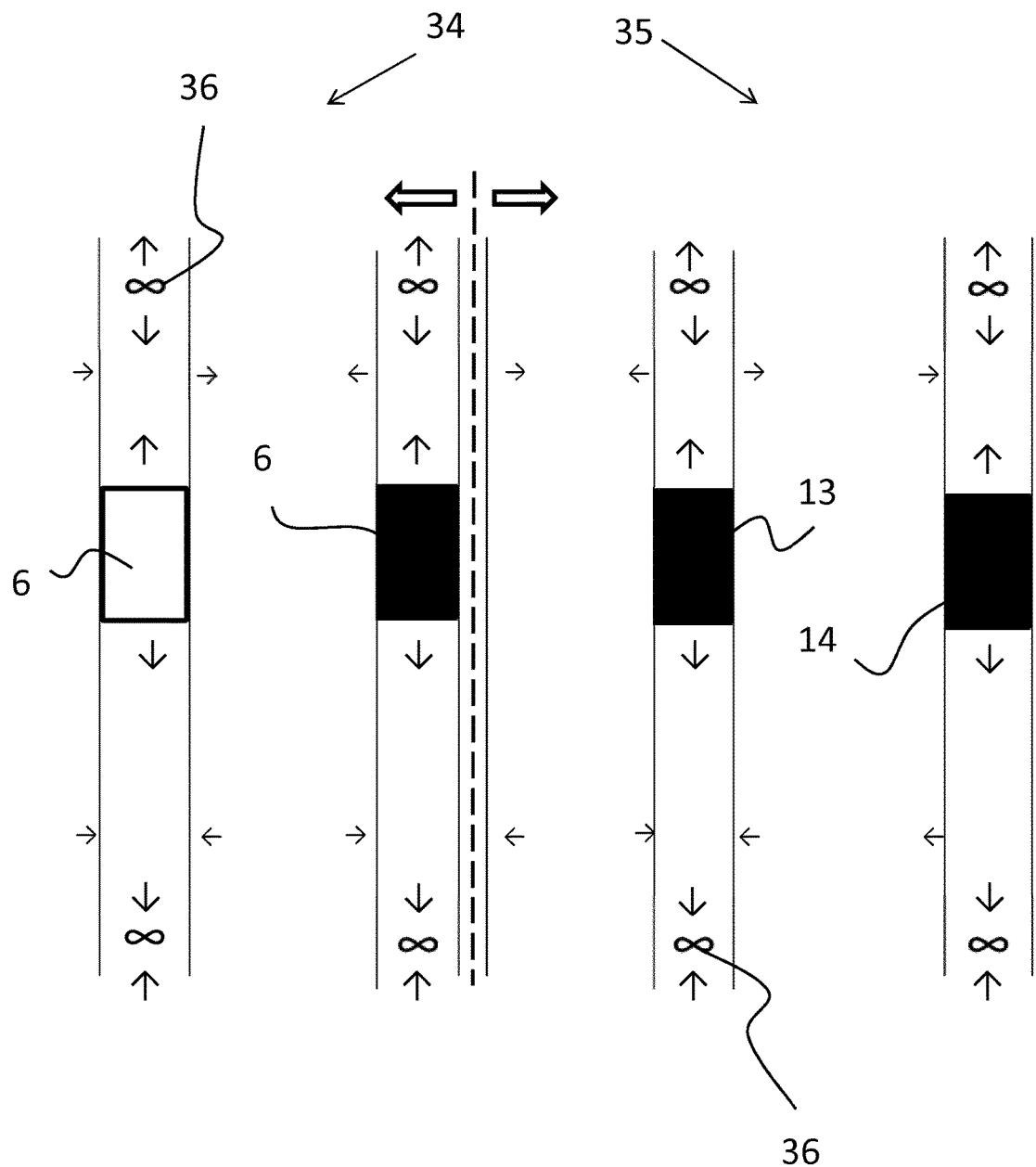
FIG. 4 shows the principle of the elevators which are divided into a clean patient side and a service side.

FIG. 4 shows the principle of the elevators which are divided into a clean patient side 34 and a service side 35.

In this exemplary embodiment, the elevators comprise wind turbines 36 in the lower and upper parts of the elevator shafts for generating energy which may also contribute to the power supply of the hospital.

Patients are transported using the elevators on the clean side 34.

Elevators 13 and 14 are used for supply purposes to the building.

Elevators 6 are provided with non-touch automatically opening doors.

Figure 5:
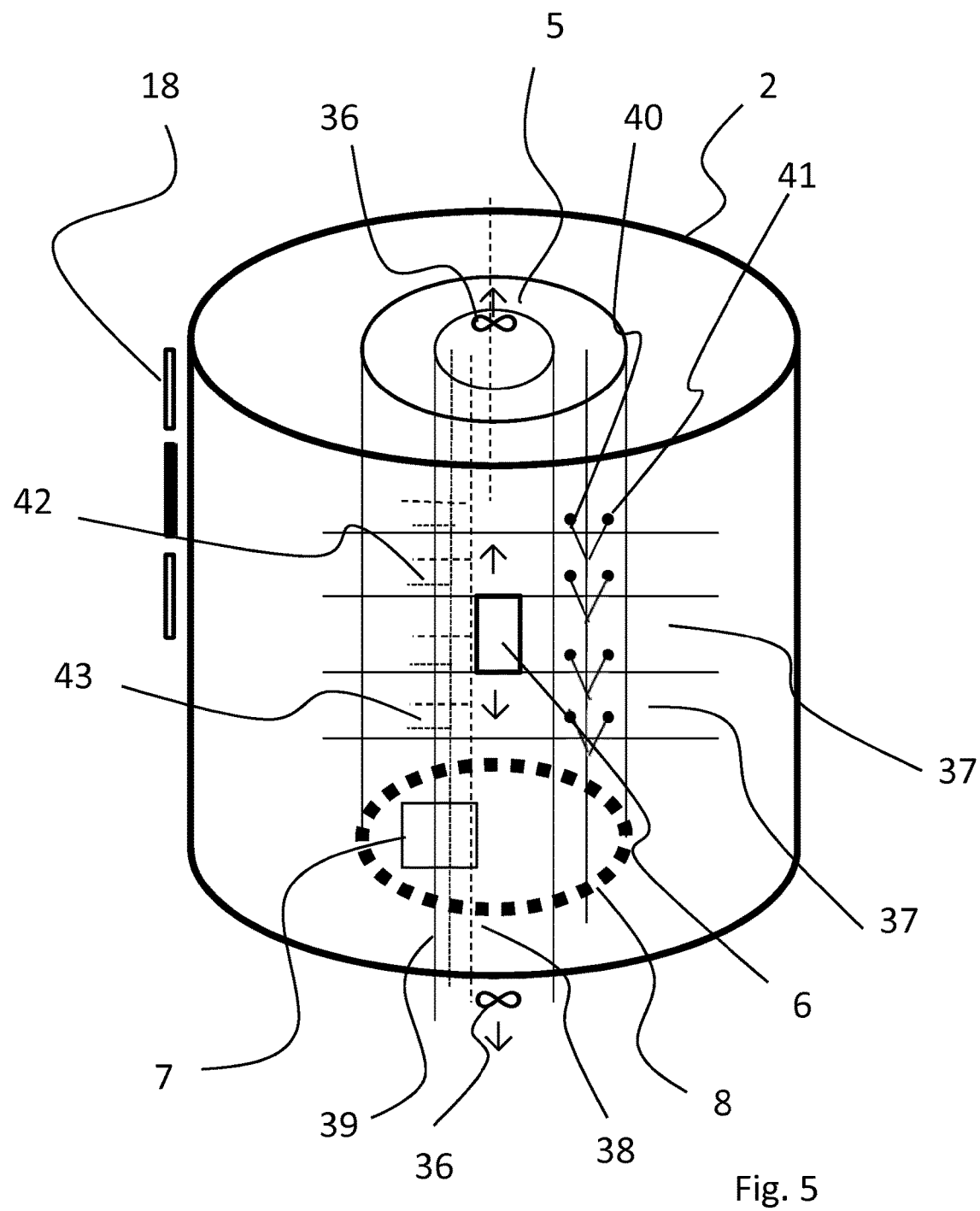
FIG. 5 shows a perspective schematic diagram of a main building.

FIG. 5 shows a perspective schematic diagram of a main building 2.

Main building 2 has a circular cylindrical shape and comprises a rotating solar module 18.

In a central core area, at least one elevator 6 is provided for patients and hospital staff.

Wind turbines 36 are arranged above and below elevator 6.

The hospital comprises a plurality of floors 37.

The floors include treatment stations 7. The treatment stations 7 arranged on the different floors can be reached by means of elevator 6.

Furthermore, a moving walkway is provided on each floor, which extends around core area 5.

In the core area, an air conditioning shaft 39 is provided running vertically through the core area.

The individual modules (not shown) are connected to the air conditioning shaft 39 via air conditioning connections 42.

Preferably, the modules are kept under a slight excess pressure, so that there is no air circulating in the building. The risk of transmission of pathogens is further reduced in this manner.

Furthermore, a shaft 38 for power supply is provided.

The individual modules are connected to the power supply shaft via electrical connections 43.

Furthermore, connections to a garbage chute 41 are provided, as well as water connections 40 which are also connected to a central duct.

Waste collection may also be accomplished centrally via the core area, through a garbage chute 41.

Figure 6:
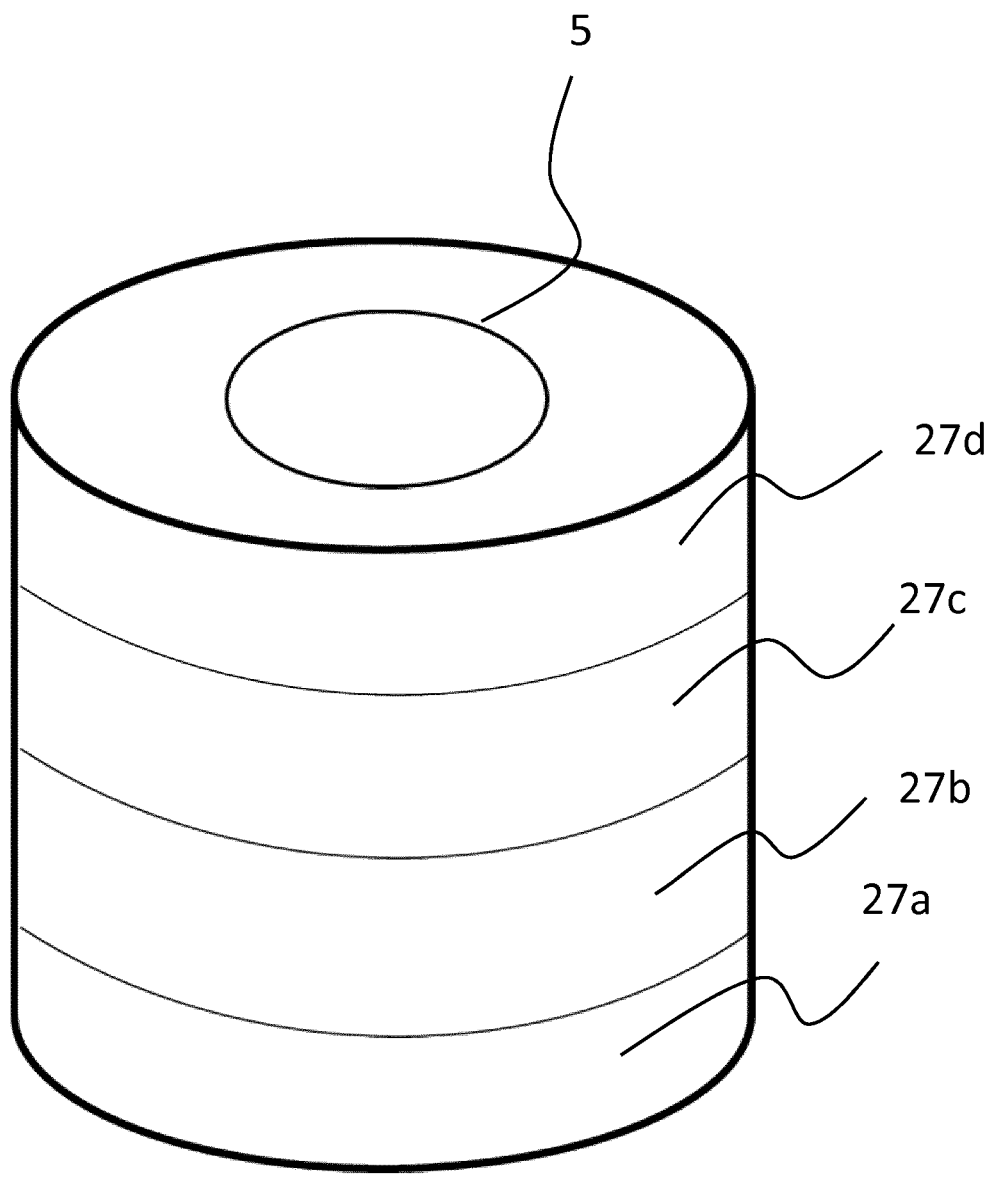
FIG. 6 is a schematic diagram illustrating how the individual floors are stacked one upon the other.

FIG. 6 is a schematic diagram illustrating how the individual floors 27a to 27d are stacked one upon the other.

Each floor consists of a plurality of modules (FIG. 2). The core area 5 preferably also has a modular configuration and is stackable.

On floor 27a, a parking garage and storage space for the supply of the hospital can be provided, for example. Floor 27b includes a lobby, and floors 27c and 27d comprise patient rooms in the outer annular area and treatment stations in the core area.

It will be clear that the main building illustrated here may be coupled to a service tower as illustrated in the preceding drawings.

Figure 7:
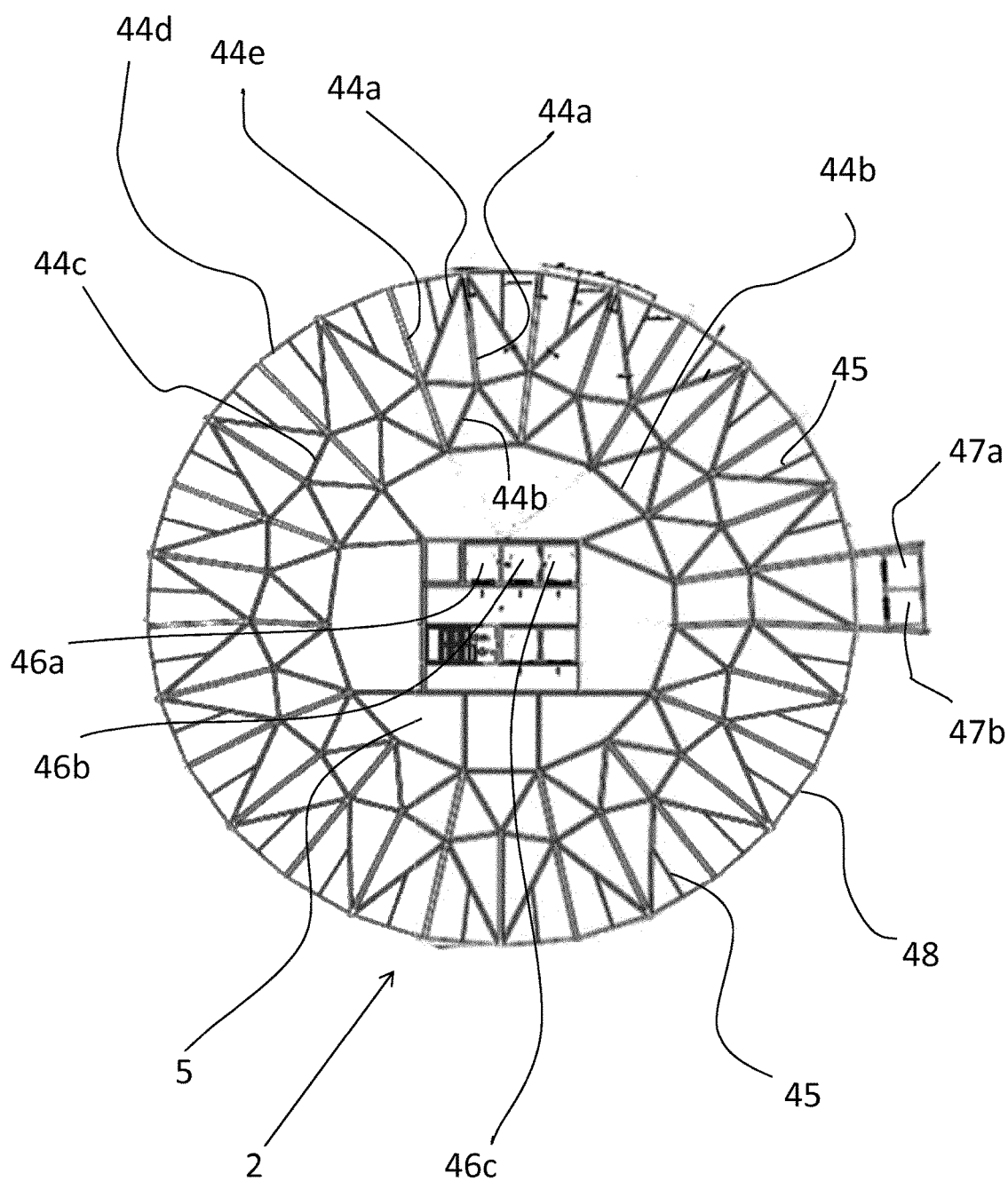
FIG. 7 is a schematic plan view of an exemplary skeletal structure of a main building.

FIG. 7 is a schematic plan view of an exemplary skeletal structure 48 of a main building 2.

The skeletal structure 48 has an annular configuration and comprises a plurality of different beams 44a to 44e.

With this exemplary embodiment it has been succeeded to construct such a skeletal structure with five different types of beams 44a-44e. Here, beams 44d form the outer surface.

Beams 44e extend from the outer surface to the core area 5 which may as well be made from cement, for example.

Between each respective pair of beams of the type 44e there is space provided for accommodating two modules (not shown).

For this purpose, a shorter beam 44a mounted centrally therebetween extends from the outer surface towards the center of the core area 5. Two further beams of beam type 44a of the same length extend from an outer connection point of beam 44a in triangularly diverging manner and are each connected to a respective beam 44e. At the end of central beam 44a, this central beam fans out into beams 44b and 44c. These four converging beams support the inserted modules from below. In the core area, elevators 46a to 46c are provided which are used to transport guests, patients, and staff.

In a separate service tower, supply of the main building 2 can be ensured using elevators 47a to 47b.

Figure 8:
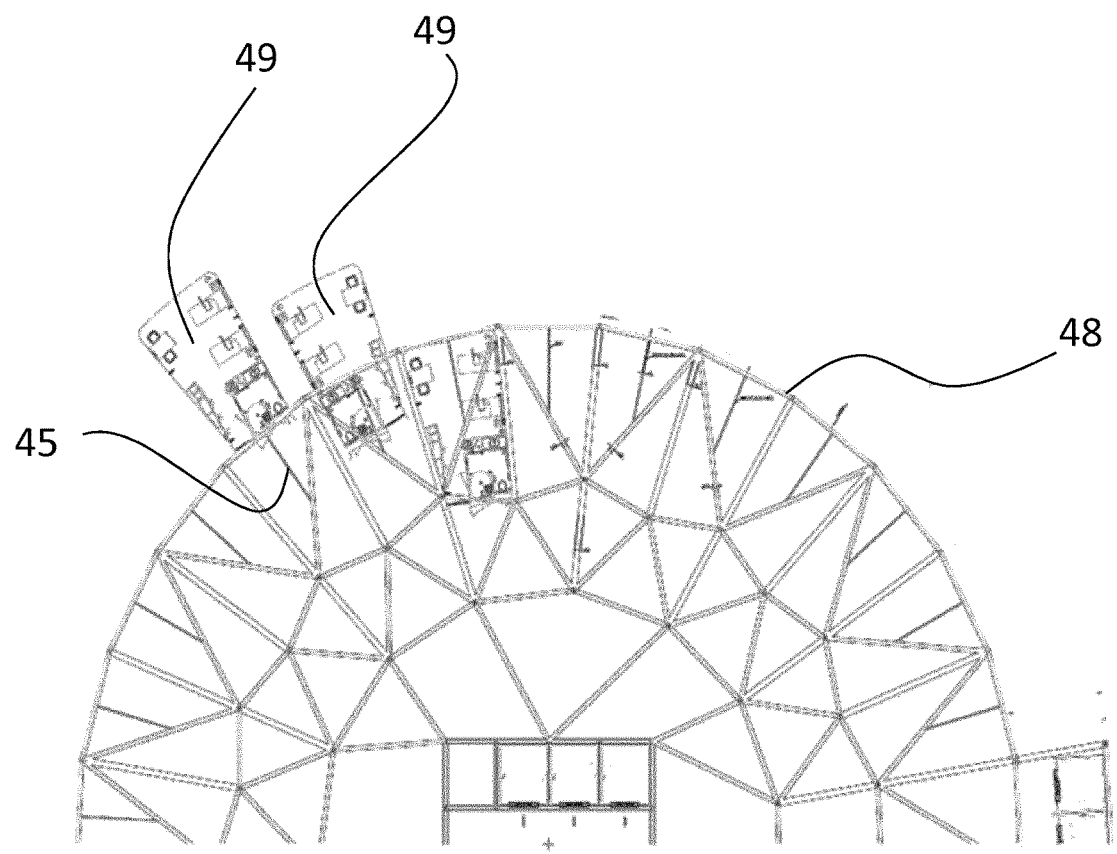
FIG. 8 shows the insertion of modules into the skeletal structure.

With reference to FIG. 8, the insertion of modules 49 into the skeletal structure 48 will be explained.

It can be seen that the modules 49 are inserted into the skeletal structure from outside.

Rail 45 of the skeletal structure serves to guide the respective module. Rail 45 can be integrated in the skeletal structure 48 with high accuracy and provides for easy radial positioning of the respective module 49.

Figure 9:
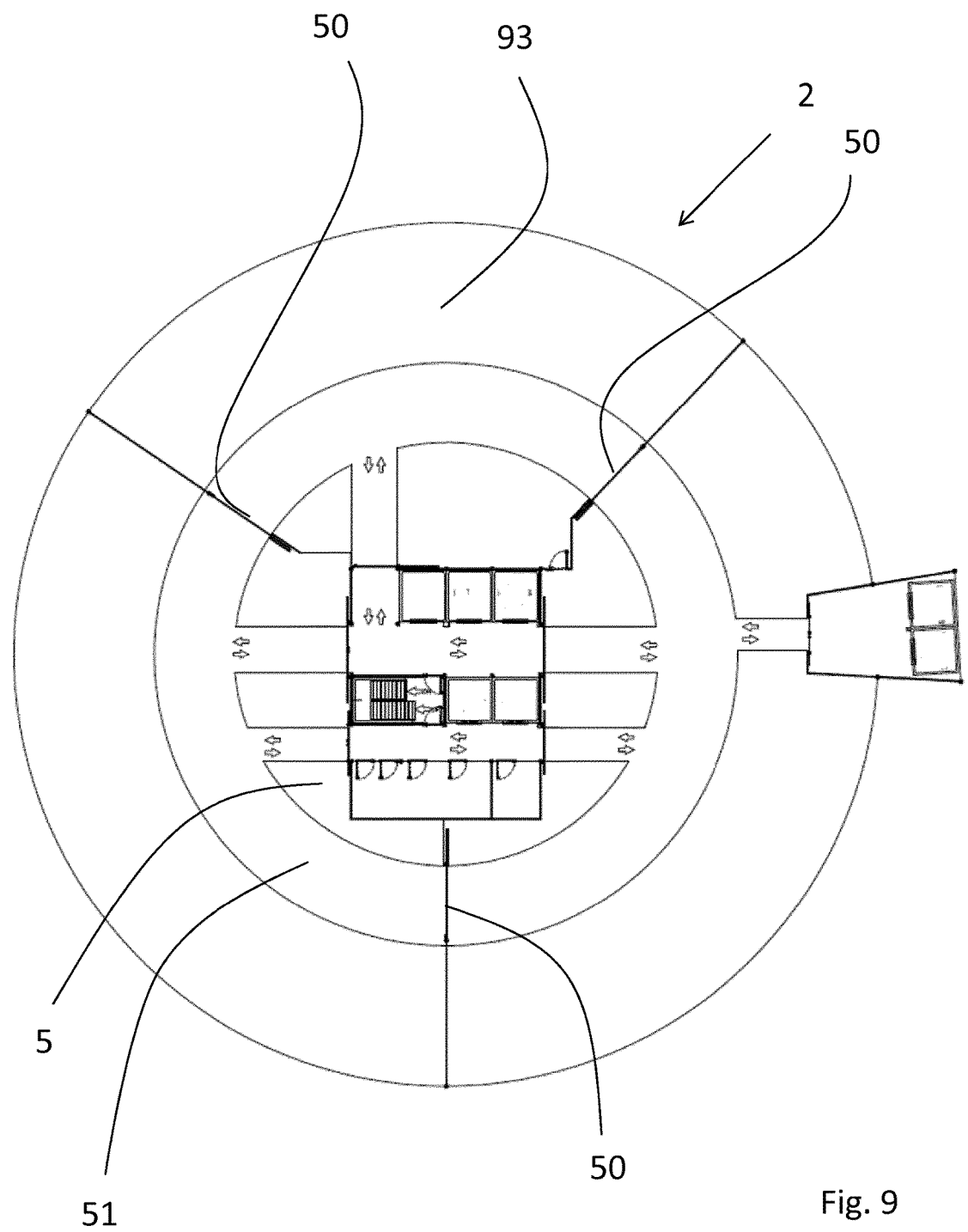
FIG. 9 schematically illustrates a main building with sliding doors.

FIG. 9 schematically illustrates a main building with sliding doors 50 which in their closed state divide into segments the corridor 51 provided between core area 5 and the ring 93 consisting of the individual modules.

Sliding doors 50 can be inserted into the ring 93.

Sliding doors 50 allow to provide for both fire protection and isolation of individual areas.

The inventive building concept thus allows in a very simple manner to rededicate individual areas of a conventionally used hospital into isolation stations within short term.

Figure 10:
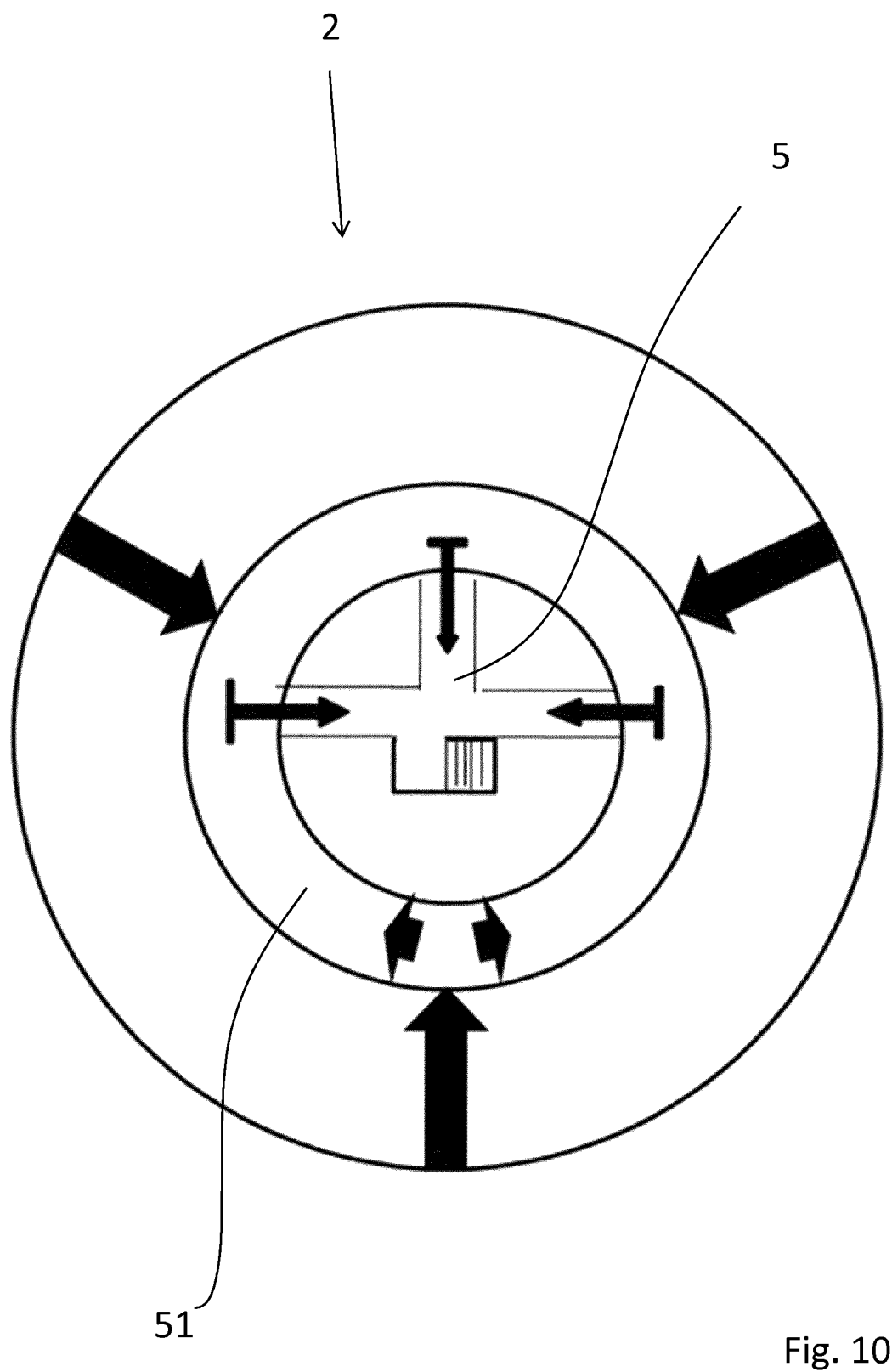
FIG. 10 shows the particularly short distances given due to the inventive building concept become clearly apparent.

Referring to FIG. 10, the particularly short distances given due to the inventive building concept become clearly apparent.

The movement direction of people when leaving the building is indicated by arrows.

It can be seen that the building can be left over very short distances through the corridor located in the core area 5.

Figure 11:
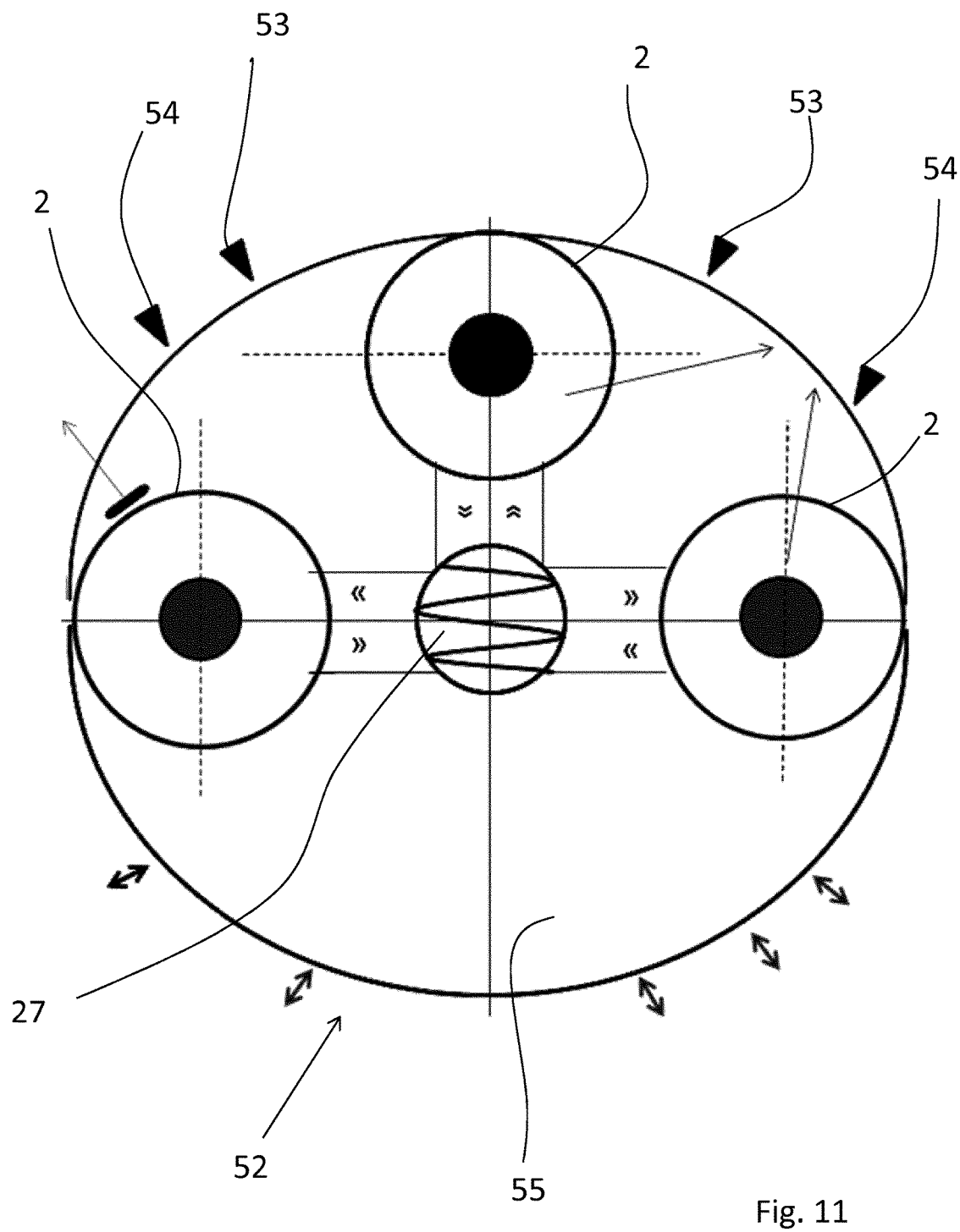
FIG. 11 shows a building complex similar to the embodiment of FIG. 3.

FIG. 11 shows a building complex 52 similar to the embodiment of FIG. 3.

Building complex 52 comprises three main buildings 2, each one having a core zone around which the modules for accommodating patients or guests are arranged.

A service tower is located centrally between the main buildings 2.

Service is accomplished via a rear side, as has already been illustrated in FIG. 3.

In contrast to FIG. 3, the building complex 52 comprises a large circular lower floor 55, on which the main buildings 2 and the service tower 27 are arranged.

Opposite to the service area, that means on the front side of the building, there are entrances to the reception 53 and to the clinic 54.

Thus, the service paths are separated from the paths for guests, staff, or patients.

Figure 12:
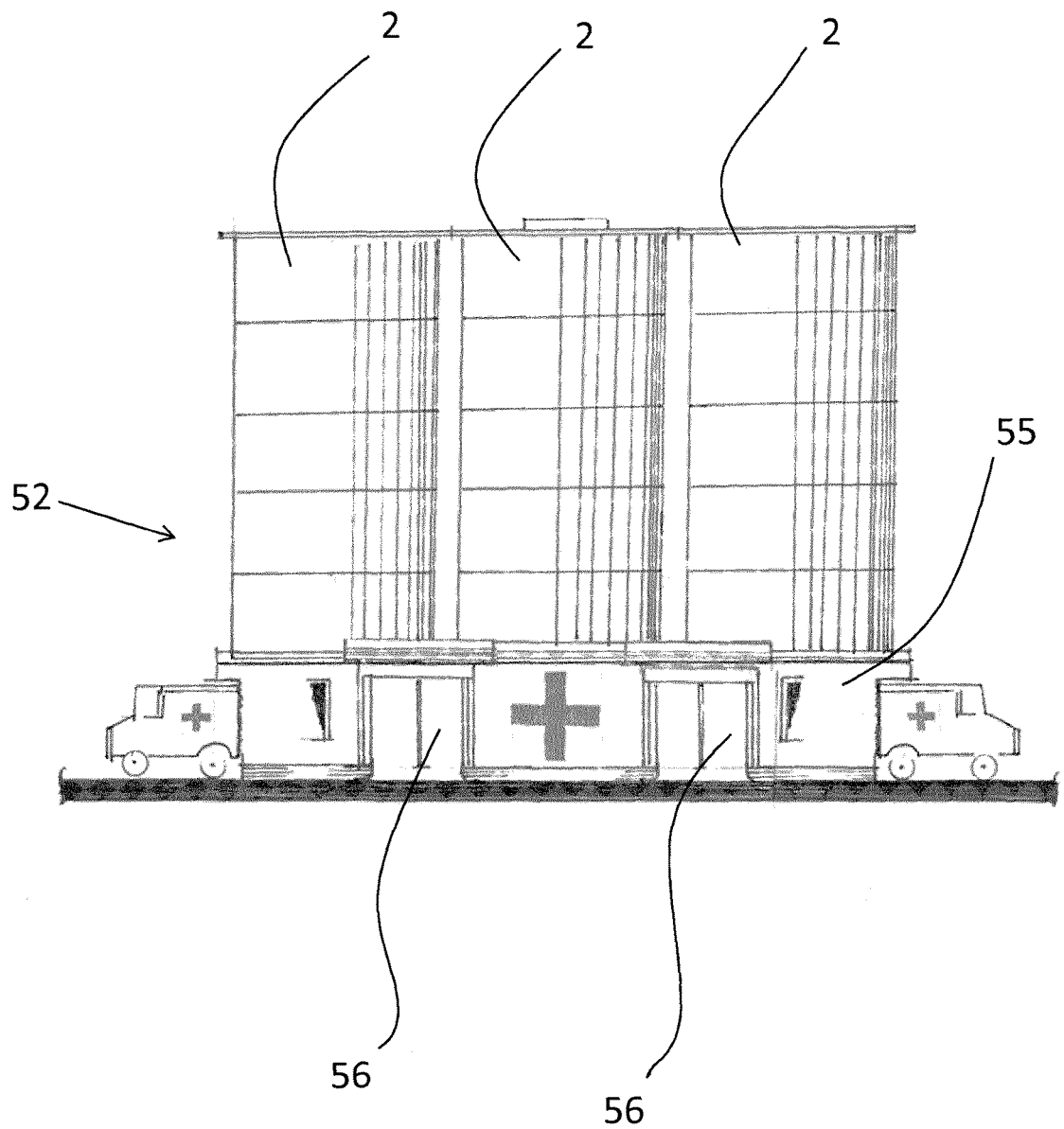
FIG. 12 shows a front side elevational view of the building complex.

FIG. 12 shows a front side elevational view of such a building complex 52.

The entrances 56 to the clinic or to the reception can be seen, which are located on the lower floor 55 which connects the individual main buildings 2.

Figure 13A:
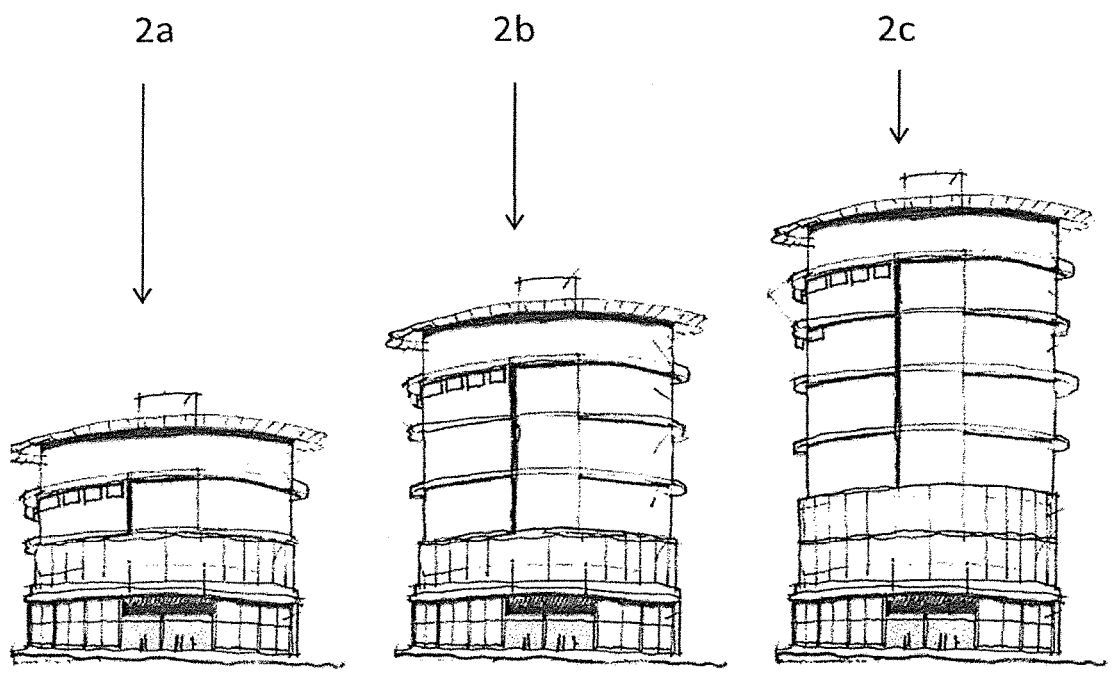
FIG. 13a illustrates that it is possible with the inventive modular building concept to erect main buildings 2a to 2c of different heights in a very simple manner with identical components.

FIG. 13 shows a rear side elevational view of building complex 52.

In this exemplary embodiment, delivery ramps labelled with numbers 1 to 6 are provided for supplying the building complex with laundry and food, by vehicles, and also for ensuring garbage collection.

FIG. 13 illustrates that it is possible with the inventive modular building concept to erect main buildings 2a to 2c of different heights in a very simple manner with identical components.

Building 2a only has four floors, while building 2c has eight floors.

Figure 14:
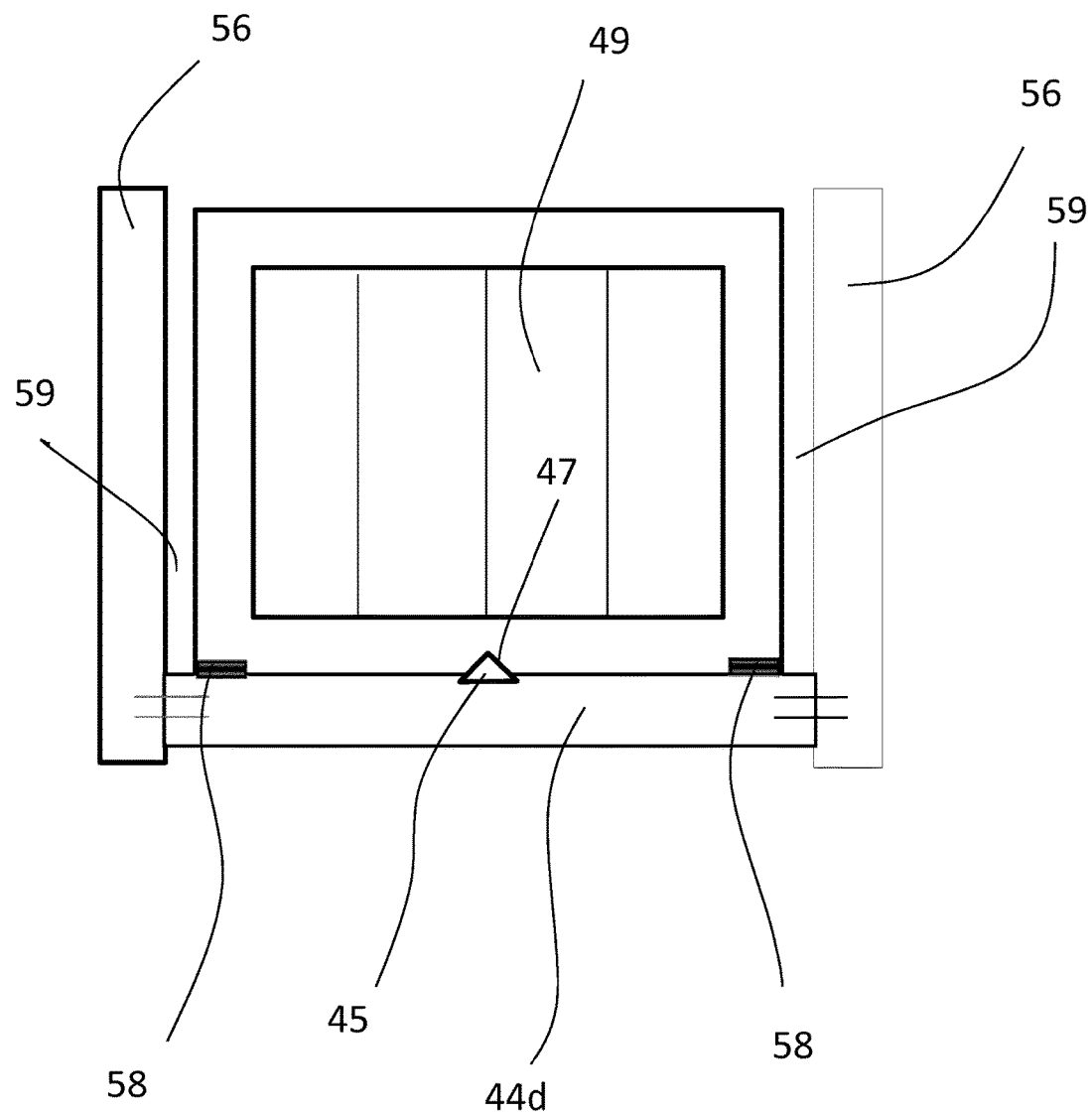
FIG. 14 shows the insertion of a module into the skeletal structure in more detail.

With reference to FIG. 14, the insertion of a module 49 into the skeletal structure will be described in more detail.

Module 49 has a groove 47 that engages rail 45 on which the module 49 is inserted.

Between the lateral walls of module 49 and vertical beam 56 of the skeletal structure there is a respective gap 59. Gap 59 preferably has a width of several centimeters.

Gap 59 permits to compensate for component tolerances of the module 49 or of the skeletal structure.

Rail 45 ensures that the module 49 is automatically placed in centered manner between vertical beams 56.

Then, module 49 can be exactly aligned horizontally using lateral height adjustment elements 58.

Height adjustment elements 58 may additionally include an elastomeric portion as well, and may thus serve as dampers.

The remaining gaps 59 can be concealed with a covering (not shown) which may especially form part of the facade.

Figure 15:
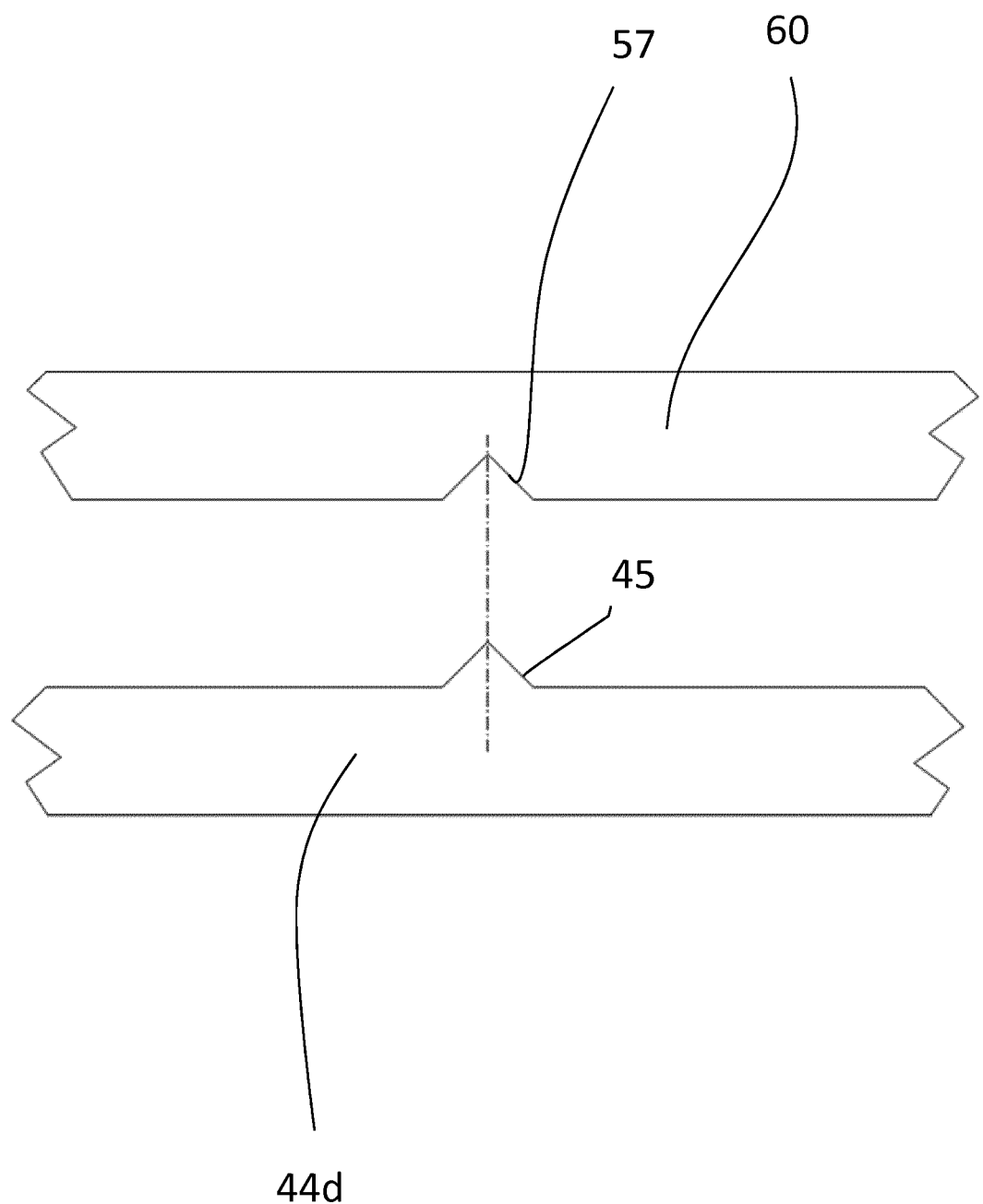
FIG. 15 shows a view in which a portion of beam can be seen, on which the rail is mounted and which has a triangular cross-sectional shape.

FIG. 15 shows a detail view.

A portion of beam 44d can be seen, on which the rail 45 is mounted which has a triangular cross-sectional shape in this embodiment.

The bottom 60 of the module has a corresponding groove 57, with a triangular cross-sectional shape in this embodiment.

Figure 16:
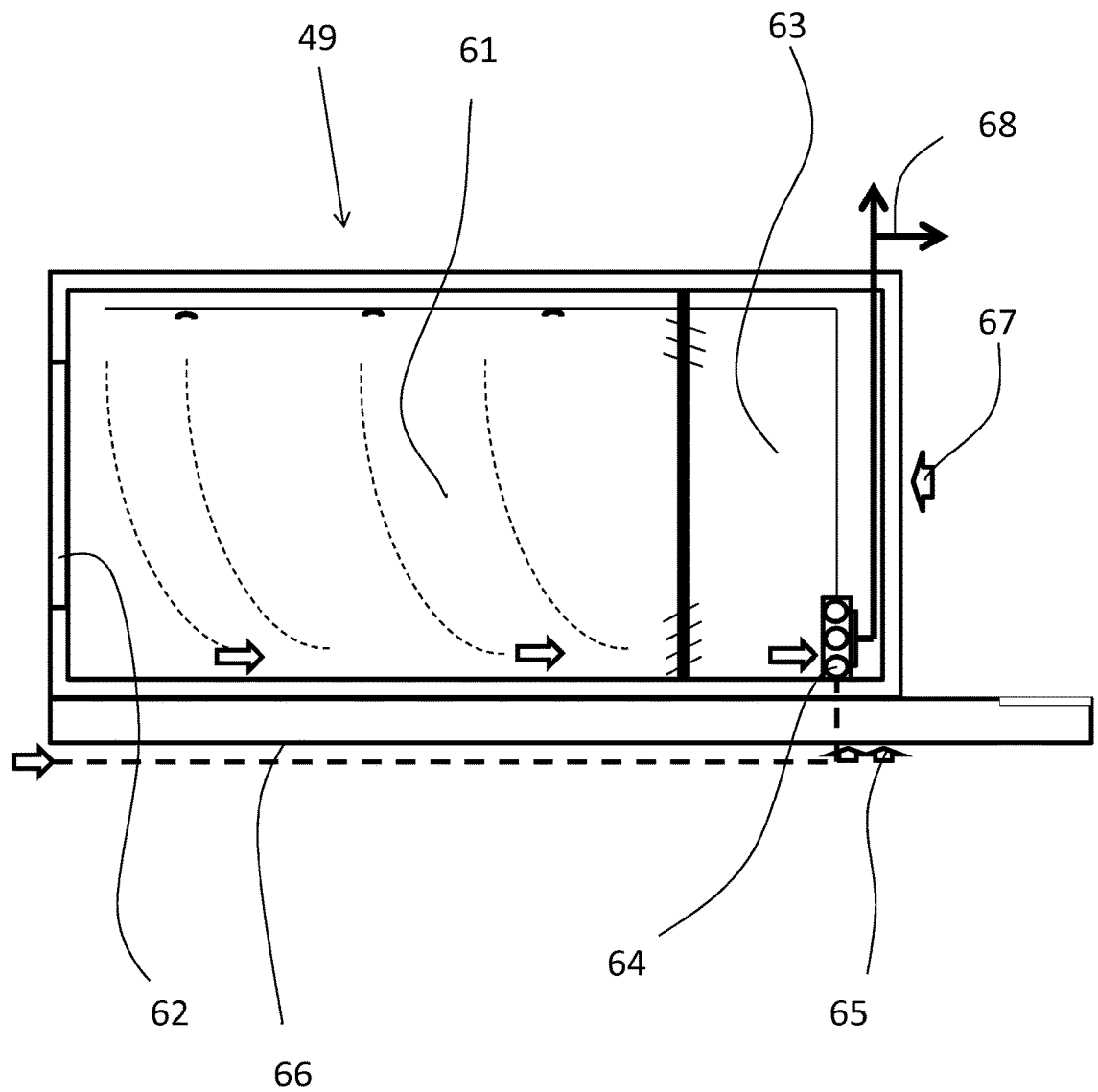
FIG. 16 shows a schematic sectional view of a module.

FIG. 16 shows a schematic sectional view of a module 49.

It can be seen that the module comprises a living room 61 with a window 62 which in the installed state defines the outer surface of the main building.

In addition to the living room, which in the case of use for a hospital in particular comprises a bed, the module includes a wet room 63 with at least a toilet and a sink. Wet room 63 includes an air conditioning system 64 which may be arranged under a sink (not shown), for example.

Through a fresh air inlet 66, fresh air reaches the air conditioning system 64.

Furthermore, the module has connections for water inlet/outlet 65. The air conditioning system 64 discharges used air 68 to the outside, or the latter is centrally collected to recover energy. The module itself may as well comprise heat exchangers for cooling down the used air being discharged and preheating the fresh air which is sucked-in.

The technical installations of the module 49 are easily accessible from one side via access 67.

Figure 17:
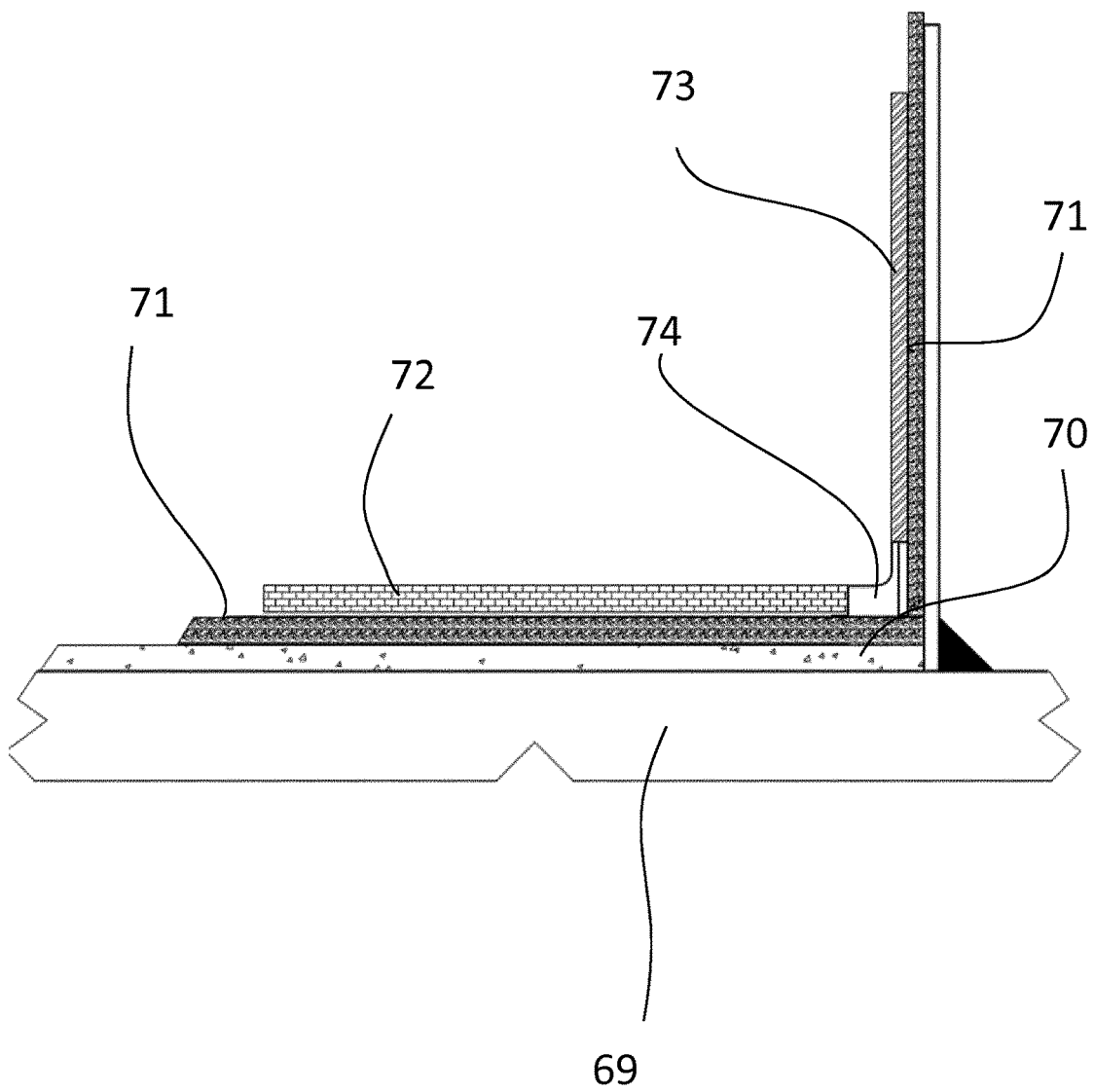
FIG. 17 shows a detailed view of the configuration of the wall and floor of an exemplary module according to the invention.

FIG. 17 shows a detailed view of the configuration of the wall and floor of an exemplary module according to the invention.

Support 69 is shown, which forms the bottom of the module and which comprises the groove enabling insertion of the module.

Support 69 is provided with a fireproof coating 70.

Both walls and floor are provided with an insulation coating 71.

On insulation coating 71, floor covering 72 and wall covering 73 is applied.

Furthermore, a metal profile 74 is mounted between floor covering 72 and wall covering 73, which is rounded and forms a joint between the wall and floor coverings.

In this way, because of the rounded corner, the module of the invention is easily cleaned, even wet, using a robot.

Figure 18:
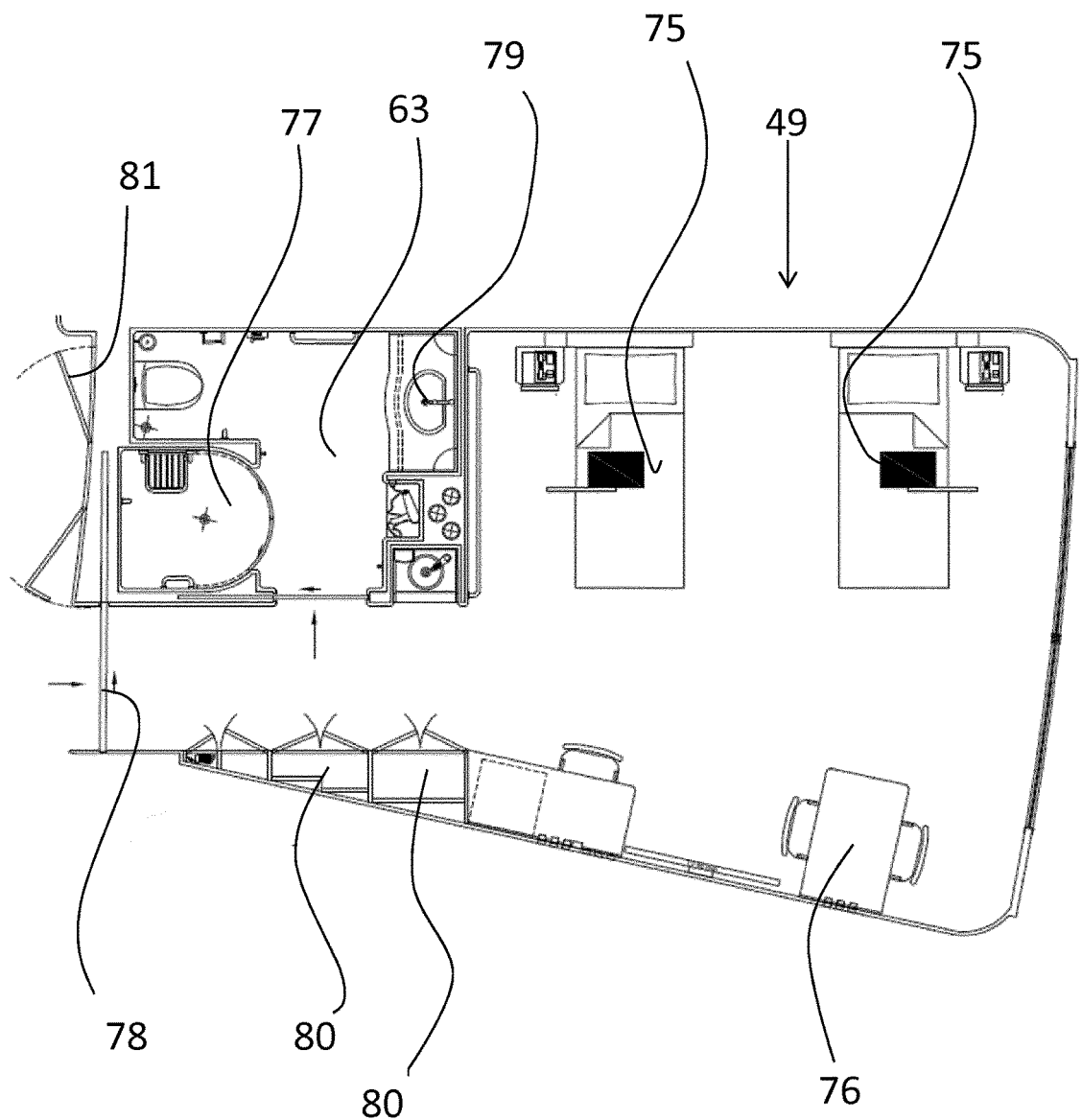
FIG. 18 shows a view of one exemplary embodiment of a module for patients.

FIG. 18 shows a view of one exemplary embodiment of a module 49 for patients.

Module 49 is wedge-shaped and is accessible through a non-touch opening sliding door 78 at the short side.

Also at the short side there is a wet room 63 inserted into the module, which in particular includes a shower and a sink 79.

Wet room 63 is accessible from the rear side via doors 81. In this manner maintenance may be performed. Optionally, it is also conceivable to introduce towels or laundry into the wet room from the rear side via doors 81.

The wet room also has a non-touch actuable sliding door 82.

The table 76 and the shelves 80 are preferably only attached to the wall, so that the floor below can be cleaned by a robot.

The wedge-shaped design illustrated herein allows for optimal utilization of space.

FIG. 18A shows a further embodiment of a module which substantially corresponds to the module shown in FIG. 18. As a difference to the embodiment of FIG. 18, the module shown in FIG. 18A comprises an entrance area with an air lock 94.

Air lock 94 is in particular intended for putting on a protective suit.

For this purpose, the air lock to the living room of the patient is accessible via an automatic door 95.

Air lock 94 is kept under excess pressure with respect to the living area of the module, so that when the automatic door 95 opens contamination of the air lock and thus of the hospital area behind is avoided.

A cabinet 96 is provided in the air lock, in which protective clothing can be stored, for example. Furthermore, cabinet 96 preferably includes a dispenser for a disinfectant liquid to be used by the staff when entering the air lock 94.

Figure 19:
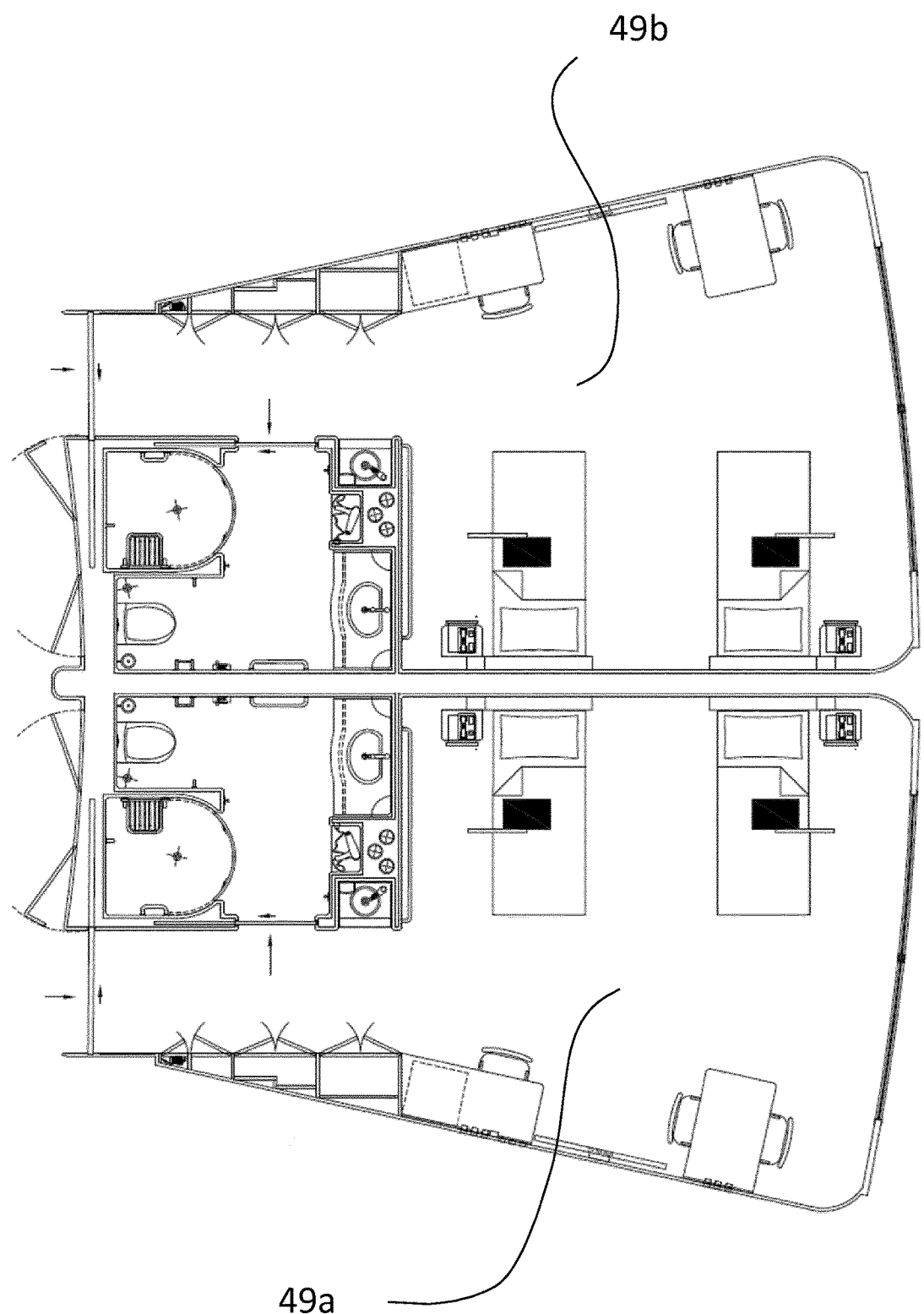
FIG. 19 shows that it is possible to provide two module types which have a mirror-inverted configuration.

As illustrated in FIG. 19, it is possible to provide two module types 49a and 49b which have a mirror-inverted configuration.

The modules have a perpendicularly configured lateral side where the wet room and the beds are arranged, whereas the opposite side has no right angled corners. Since this area serves as a living area, a rectangular configuration is not needed and optimum utilization of space is made possible, so as to form a ring of the building together with further modules.

Figure 20:
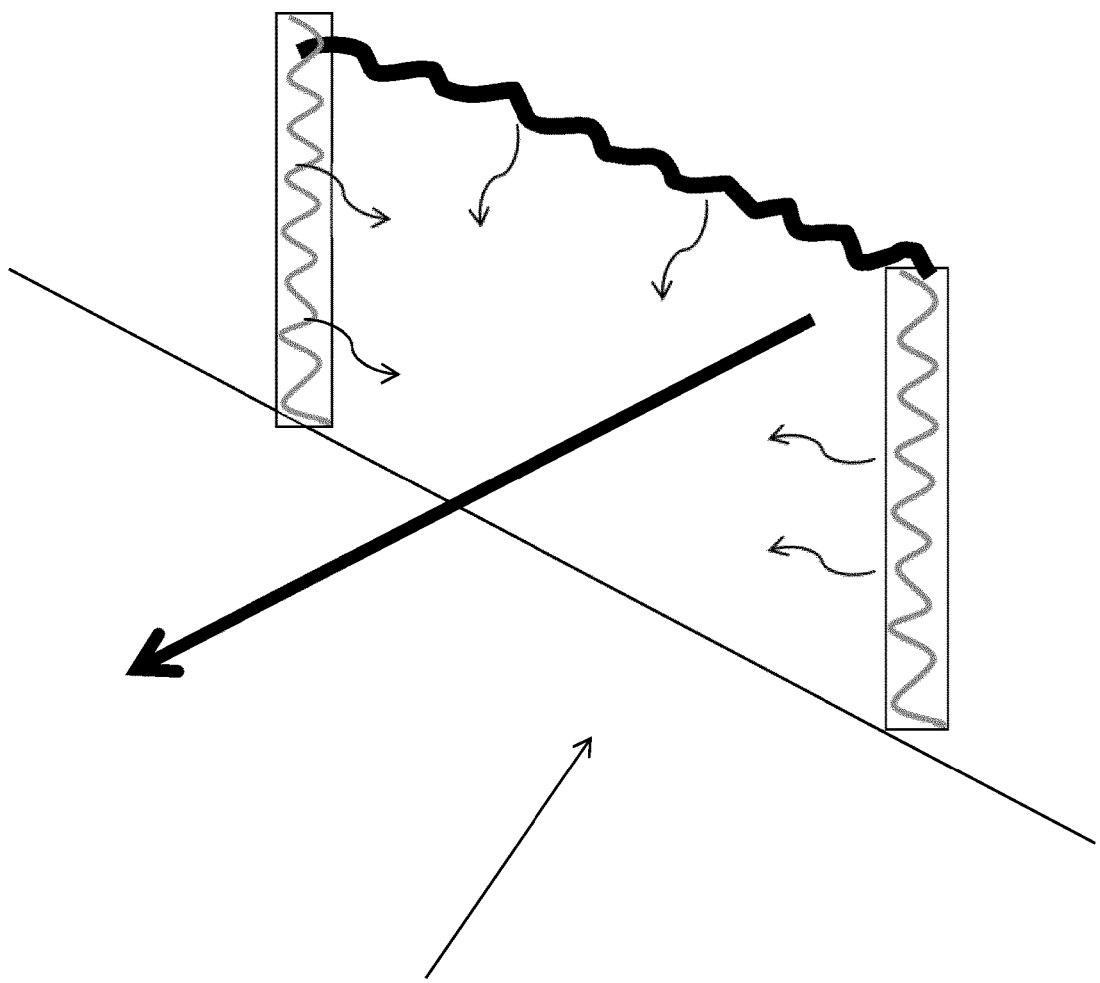
FIG. 20 shows a UV lock which is in particular employed in the corridor.

FIG. 20 shows a UV lock 83 which is in particular employed in the corridor (12 in FIG. 1) extending from the service tower and illustrated in FIG. 1, for example.

The vehicles used for service in the building are disinfected using the UV light, and this reduces the risk of infection while the service vehicles are in the patient area of the hospital.

Figure 21:
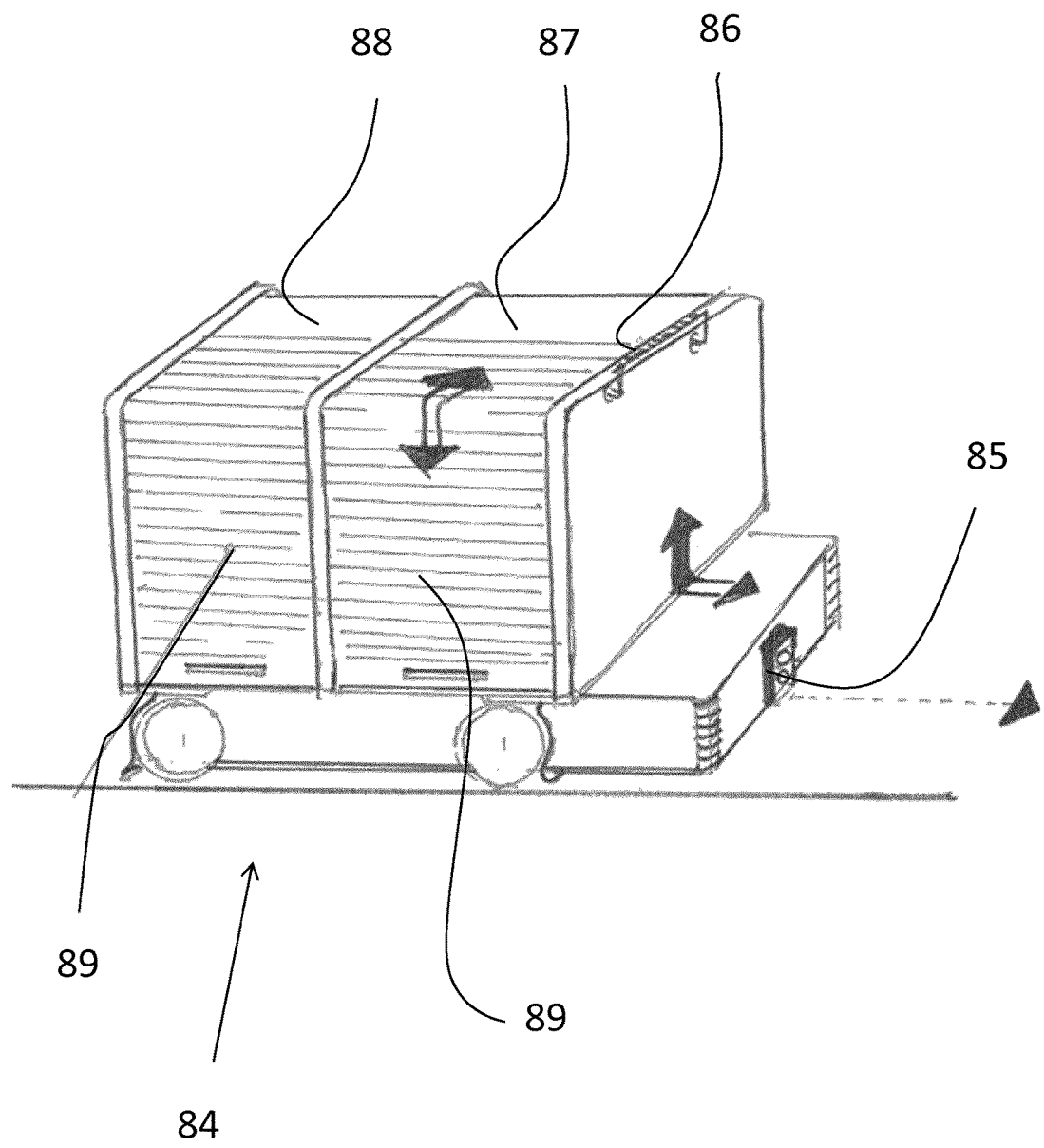
FIG. 21 shows an automatically moving vehicle that may be used for the inventive building concept.

FIG. 21 shows an automatically moving vehicle 84 that may be used for the inventive building concept.

The vehicle 84 comprises a sensor unit 85. The configuration of automatically moving vehicles is per se known to persons skilled in the art.

Simply designed vehicles orientate themselves based on strips introduced in the floor, such as a magnetic strip, and have infrared or ultrasonic sensors to stop the vehicle when confronting a person.

The vehicle of the invention is battery powered and has two chambers 87, 88, one chamber of which is intended for delivering hot meals, while the other chamber is cool and serves to store fruits or cold beverages, for example.

It is also possible for chambers 87, 88 to be cooled using a refrigeration device, or to be heated.

Chambers 87, 88 are closed by roller shutters 89.

When the food is distributed, the roller shutters are slid upwards thereby gradually clearing food inserts. In this manner, it is ensured that the respective insert is only opened when the food is being delivered.

Figure 22:
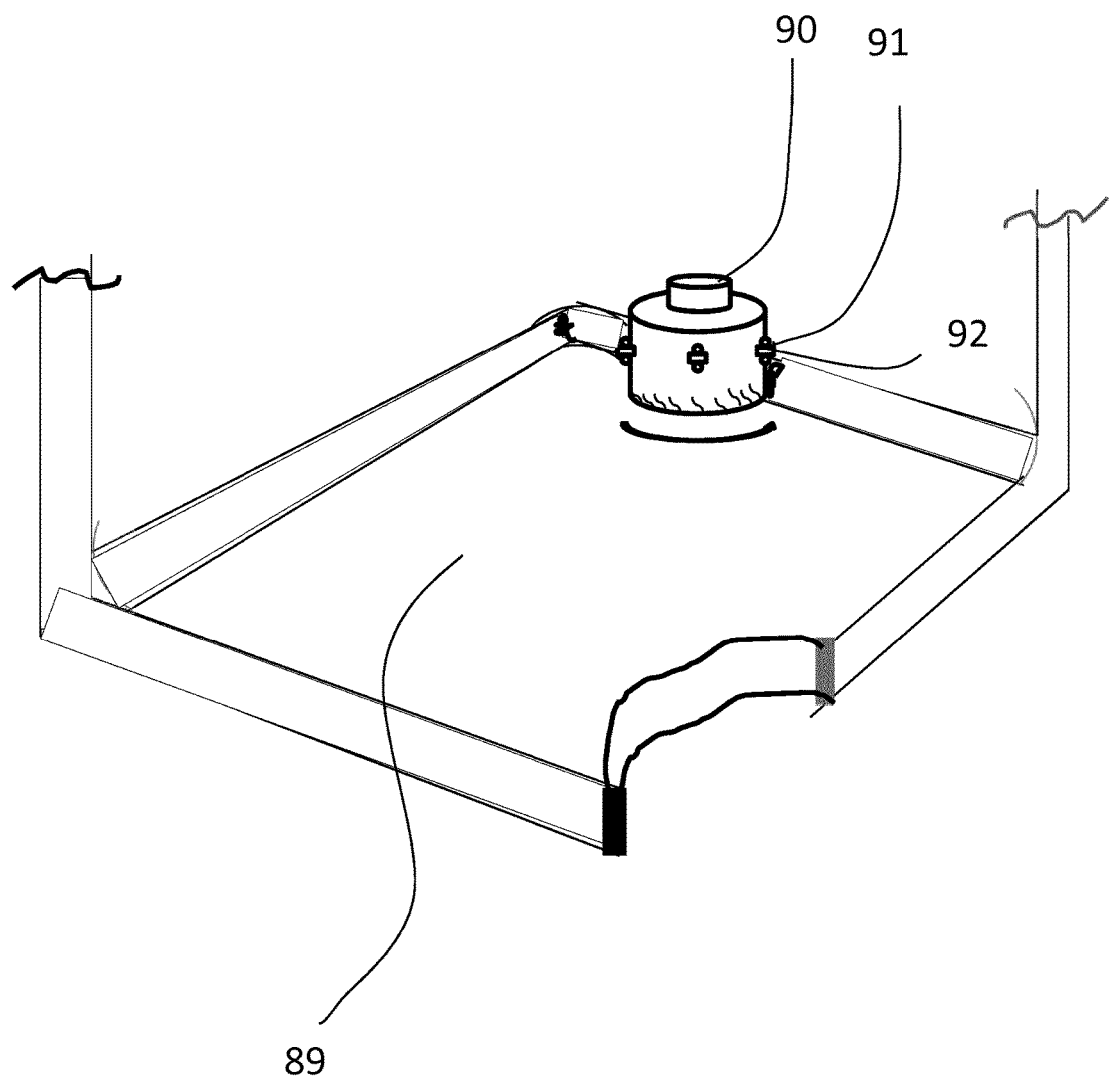
FIG. 22 illustrates the cleaning of the floor of a module using a cleaning robot.

FIG. 22 illustrates the cleaning of the floor 89 of a module using a cleaning robot 90.

Cleaning robot 90 comprises sensors 91 and peripherally arranged brushes 92 or rags.

The rounded corners and edges all around through which the floor 89 merges into the wall allow for fully automated cleaning of the entire floor including the corners and edges.

The invention permits to provide a hospital with short distances, which can be operated with substantially increased efficiency, for optimal patient care. Moreover, the hospital can be erected within a short time, it is energy-efficient and has a space-saving configuration.

LIST OF REFERENCE NUMERALS

1 Hospital
2 Main building
3 Patient room
4 Wall
5 Core area
6 Elevator
7 Treatment station
8 Moving walkway
9 Walkway
10 Walkway
11 Corridor
12 Corridor
13 Elevator
14 Elevator
15 Bathroom
16 Bathroom
17 Service shaft
18 Solar module
19 Bed
20 Patients module
21 Window
22 Table
23 Door
24 Hatch
25 Hatch
26 Hatch
27 Service tower
28 Corridor
29 Delivery area for medical products
30 Food delivery area
31 Laundry delivery area
32 Delivery area for maintenance
33 Garbage collection area
34 Clean side
35 Service side
36 Wind turbine
37 Floor
38 Shaft for power supply
39 Air conditioning shaft
40 Water connection
41 Garbage chute
42 Air conditioning connection
43 Electrical connection
44a-e Beam
45 Rail
46a-c Elevator
47a-b Elevator
48 Skeletal structure
49 Module
50 Sliding door
51 Corridor
52 Building complex
53 Reception
54 Clinic
55 Lower floor
56 Beam
57 Groove
58 Height adjustment element
59 Gap
60 Floor
61 Living room
62 Window
63 Wet room
64 Air conditioning system
65 Water inlet/outlet
66 Fresh air inlet
67 Access
68 Exhaust air
69 Support
70 Fireproof coating
71 Insulation coating
72 Floor covering
73 Wall covering
74 Metal profile
75 Bed
76 Table
77 Shower
78 Sliding door
79 Sink
80 Shelf
81 Door
82 Sliding door
83 UV lock
84 Vehicle
85 Sensor component
86 Handle
87 Chamber
88 Chamber
89 Floor
90 Cleaning robot
91 Sensor
92 Brush
93 Ring
94 Air lock
95 Automatic door
96 Cabinet

What is claimed is:

1. A building, comprising a skeletal structure with a plurality of floors, wherein individual modules including one or more rooms are inserted into said skeletal structure, wherein each of the modules is inserted on a guide rail that is attached to the skeleton structure, wherein each of the modules has a bottom with a groove for engaging the guide rail, the groove having a triangular cross-sectional shape, wherein at least one height adjustment element is arranged at the bottom of each of the modules, which bears upon the skeletal structure in the inserted state of the module, wherein each of the modules comprises connections for water, electricity and wastewater, and wherein each of the modules has its own air inlet.

2. The building as claimed in claim 1, wherein the skeletal structure has a round cross-sectional shape or a polygonal cross-sectional shape with at least five corners.

3. The building as claimed in claim 2, wherein at least one service tower is arranged outside of the skeletal structure and is connected thereto via at least one corridor.

4. The building as claimed in claim 1, wherein the groove is arranged approximately centrally.

5. The building as claimed in claim 1, wherein in an inserted state each of the modules is supported on vibration dampers.

6. The building as claimed in claim 5, wherein the vibration dampers are part of the at least one height adjustment element.

7. The building as claimed in claim 1, wherein the building comprises a core area and the inserted modules comprise a ring wherein the core area is arranged inside the ring.

8. The building as claimed in claim 7, wherein a corridor is provided between the ring and the core area.

9. The building as claimed in claim 8, wherein the corridor is segmented by sliding doors.

10. The building as claimed in claim 7, wherein at least one elevator is arranged in the core area.

11. The building as claimed in claim 1, wherein fire protection intermediate ceilings are installed in the skeletal structure.

12. The building as claimed in claim 1, wherein the modules are connected to service lines for water, waste water, and/or electricity running vertically through the building.

13. A building complex, comprising a plurality of buildings as claimed in claim 1, wherein the buildings are joined together by at least one common lower floor.

14. The building as claimed in claim 1, wherein said building is configured as a hospital.

15. A module comprising at least one room, adapted for being inserted into a building as claimed in claim 1.

16. The module as claimed in claim 15, wherein the module is wedge-shaped and has at least one window arranged along a major end face and at least one door arranged along a minor end face.

17. A building comprising:
a skeletal structure with a plurality of floors and core area,
a ring of individual modules including one or more rooms inserted into said skeletal structure such that the core area is arranged inside the ring of the individual modules;
wherein the building is configured as a hospital;
wherein each of the modules is inserted on a guide rail that is attached to the skeleton structure;
wherein each of the modules has a bottom with a groove for engaging the guide rail, the groove having a triangular cross-sectional shape which allows a height of each of the modules to be adjusted;
wherein at least one height adjustment element is arranged at the bottom of each of the modules, which bears upon the skeletal structure in the inserted state of the module;
wherein each of the modules comprises connections for water, electricity and wastewater; and
wherein each of the modules has its own air inlet.

* * * * *